(12) United States Patent
Korjus et al.

(10) Patent No.: US 11,270,457 B2
(45) Date of Patent: Mar. 8, 2022

(54) DEVICE AND METHOD FOR DETECTION AND LOCALIZATION OF VEHICLES

(71) Applicant: STARSHIP TECHNOLOGIES OÜ, Tallinn (EE)

(72) Inventors: Kristjan Korjus, Tallinn (EE); Sergii Kharagorgiiev, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 69 days.

(21) Appl. No.: 16/689,405

(22) Filed: Nov. 20, 2019

(65) Prior Publication Data

US 2020/0090366 A1    Mar. 19, 2020

Related U.S. Application Data

(63) Continuation of application No. PCT/EP2018/063560, filed on May 23, 2018.

(30) Foreign Application Priority Data

May 24, 2017   (EP) .................................. 17172808

(51) Int. Cl.
  *G06K 9/00*     (2006.01)
  *G06T 7/73*     (2017.01)
  (Continued)

(52) U.S. Cl.
  CPC ............... *G06T 7/73* (2017.01); *G01C 21/30* (2013.01); *G01S 13/58* (2013.01); *G01S 13/867* (2013.01); *G06K 9/00805* (2013.01); *G06K 9/6289* (2013.01); *G06T 7/246* (2017.01); *G05D 1/0088* (2013.01); *G05D 1/0238* (2013.01);
  (Continued)

(58) Field of Classification Search
  None
  See application file for complete search history.

(56) References Cited

U.S. PATENT DOCUMENTS

| 4,549,841 A | 10/1985 | Ishige |
| 5,664,928 A | 9/1997 | Stauber |

(Continued)

FOREIGN PATENT DOCUMENTS

| DE | 10 2016 007 467 | 6/2016 |
| DE | 10 2015 209 127 | 11/2016 |

(Continued)

OTHER PUBLICATIONS

Coxworth, Ben, "HorseFly delivery drone would use a van as its base-on-the-go", New Atlas, Ohio, Jun. 6, 2014.
(Continued)

*Primary Examiner* — Wei Wen Yang
(74) *Attorney, Agent, or Firm* — Siritzky Law, PLLC

(57) ABSTRACT

The present invention relates to a method for determining a location of an object, the method comprising processing image data to determine a direction between a camera capturing an image and the object; processing additional data comprising at least one of map data and velocity sensor data; and combining information based on the image data and the additional data to arrive at a location of the object. The present invention also relates to a corresponding robot configured to carry out such a method.

18 Claims, 11 Drawing Sheets

(51) Int. Cl.

| | | |
|---|---|---|
| *G06T 7/246* | (2017.01) | |
| *G01C 21/30* | (2006.01) | |
| *G01S 13/58* | (2006.01) | |
| *G01S 13/86* | (2006.01) | |
| *G06K 9/62* | (2022.01) | |
| *G05D 1/00* | (2006.01) | |
| *G05D 1/02* | (2020.01) | |

(52) U.S. Cl.
CPC ... *G05D 1/0251* (2013.01); *G05D 2201/0213* (2013.01); *G06T 2207/30236* (2013.01); *G06T 2207/30261* (2013.01)

(56) References Cited

U.S. PATENT DOCUMENTS

| | | |
|---|---|---|
| 5,942,869 A | 8/1999 | Katou et al. |
| 6,307,484 B1 | 10/2001 | Sasaki |
| 6,467,293 B1 | 10/2002 | Goosman |
| 6,602,037 B2 | 8/2003 | Winkler |
| 7,073,634 B2 | 7/2006 | Mitchell et al. |
| 7,202,776 B2 | 4/2007 | Breed |
| 7,320,289 B1 | 1/2008 | Clarke |
| 7,894,939 B2 | 2/2011 | Zini et al. |
| 7,931,431 B2 | 4/2011 | Benedict et al. |
| 8,010,230 B2 | 8/2011 | Zini |
| 8,104,601 B2 | 1/2012 | Hayduchok |
| 8,204,624 B2 | 6/2012 | Zini et al. |
| 8,267,307 B1 | 9/2012 | Leon et al. |
| 8,485,285 B2 | 7/2013 | Ferrigni |
| 8,874,360 B2 | 10/2014 | Klinger et al. |
| 8,948,914 B2 | 2/2015 | Aldo et al. |
| 9,020,632 B2 | 4/2015 | Naylor |
| 9,031,692 B2 | 5/2015 | Dingju |
| 9,073,637 B2 | 7/2015 | Ohtomo et al. |
| 9,244,147 B1 | 1/2016 | Soundararajan et al. |
| 9,256,852 B1 | 2/2016 | Myllymaki |
| 9,266,675 B2 | 2/2016 | Yamashita |
| 9,305,280 B1 | 4/2016 | Berg et al. |
| 9,373,149 B2 | 6/2016 | Abhyanker |
| 9,557,740 B2 | 1/2017 | Crawley |
| 9,561,941 B1 | 2/2017 | Watts |
| 9,694,976 B1 | 7/2017 | Wurman et al. |
| 9,844,879 B1 | 12/2017 | Cousins et al. |
| 2003/0165373 A1 | 9/2003 | Felder et al. |
| 2004/0211834 A1 | 10/2004 | Fleckenstein et al. |
| 2005/0207876 A1 | 9/2005 | Springwater |
| 2006/0237239 A1 | 10/2006 | Bruner et al. |
| 2008/0040031 A1 | 2/2008 | Tu |
| 2011/0079166 A1 | 4/2011 | Popa-Simil |
| 2012/0090110 A1 | 4/2012 | Van Den Berg |
| 2012/0113262 A1 | 5/2012 | Hanisch et al. |
| 2013/0030697 A1 | 1/2013 | Bartels |
| 2013/0110281 A1 | 5/2013 | Jones et al. |
| 2013/0332021 A1 | 12/2013 | Goren |
| 2014/0032034 A1 | 1/2014 | Raptopoulos |
| 2014/0081445 A1 | 3/2014 | Villamar |
| 2014/0136414 A1 | 5/2014 | Abhyanker |
| 2014/0207701 A1 | 7/2014 | Kadaba |
| 2014/0254896 A1 | 9/2014 | Zhou et al. |
| 2014/0365258 A1 | 12/2014 | Vestal et al. |
| 2015/0006005 A1 | 1/2015 | Yu et al. |
| 2015/0045945 A1 | 2/2015 | Zini et al. |
| 2015/0100152 A1 | 4/2015 | Trevino et al. |
| 2015/0110344 A1 | 4/2015 | Okumura |
| 2015/0183528 A1 | 7/2015 | Walsh |
| 2015/0183581 A1 | 7/2015 | Worsley |
| 2015/0379468 A1 | 12/2015 | Harvey |
| 2016/0107750 A1 | 4/2016 | Yates |
| 2016/0185466 A1 | 6/2016 | Dreano |
| 2016/0200438 A1 | 7/2016 | Bokeno et al. |
| 2016/0207710 A1 | 7/2016 | Conrad et al. |
| 2016/0325928 A1 | 11/2016 | Lepek et al. |
| 2016/0355337 A1 | 12/2016 | Lert et al. |
| 2016/0368464 A1 | 12/2016 | Hassounah |
| 2017/0017237 A1 | 1/2017 | Tokuyama et al. |
| 2017/0050747 A1 | 2/2017 | Wessler |
| 2017/0100837 A1 | 4/2017 | Zevenbergen et al. |
| 2017/0124512 A1 | 5/2017 | Harvey |
| 2017/0185853 A1 | 6/2017 | Yokota et al. |
| 2017/0220981 A1 | 8/2017 | Shucker et al. |
| 2017/0267452 A1 | 9/2017 | Goren et al. |
| 2017/0323458 A1* | 11/2017 | Lablans ............... G06F 16/29 |
| 2018/0020896 A1 | 1/2018 | High et al. |
| 2018/0232947 A1* | 8/2018 | Nehmadi ............ G01S 17/931 |
| 2018/0349834 A1 | 12/2018 | Heinla |

FOREIGN PATENT DOCUMENTS

| | | |
|---|---|---|
| EP | 2 818 958 | 12/2014 |
| WO | WO2002042117 | 5/2002 |
| WO | WO 2011/035839 A2 | 3/2011 |

OTHER PUBLICATIONS

Move over Amazon! Packages could one day be delivered by unicycle drones that swarm together to transport heavy parcels, dated Aug. 21, 2015, Daily Mail, Richard Gray [http://www.dailymail.co.uk/sciencetech/article-3205933/Move-Amazon-Packages-one-day-delivered-unicycle-drones-swarm-transport-heavy-parcels.html].

Bill McNeil, The Top Five Things You Need to Know about Drones and GIS, Geospatial Newsletters, Directions Magazine, Aug. 25, 2014.

Baker: "Automated Street Crossing for Assistive Robots," Proc. 2005 IEEE, Jun. 28-Jul. 1, 2005.

Jeniece Pettitt: "Forget delivery drones, meet your new delivery robot", Nov. 2, 2015, CNBC, Retrieved from the Internet: URL: https://www.cnbc.com/2015/11/02/forget-delivery-drones-meet-your-new-delivery-robot.html.

Anonymous: "Lieferroboter Starship: "Klauen würde ich ihn nicht"—Auto-Tagesspiegel" ("I wouldn't steal him") Nov. 29, 2015, Retrieved from the Internet: URL: http://www.tagesspiegel.de/mobil/lieferroboter-starship-klauen-wuerde-ich-ihn-nicht/12647114.html, English translation.

WIPO, (IB/373) International Preliminary Report on Patentability Chapter I, PCT/EP2018/063560, dated Nov. 26, 2019, (12p.).

WIPO, (ISA/210) International Search Report, PCT/EP2018/063560, dated Nov. 29, 2018, (6p.).

WIPO, (ISA/237) Written Opinion of the International Searching Authority, PCT/EP2018/063560, dated Nov. 29, 2018, (11p.).

EPO, Amended claims with annotations, in EP 18724911.5, Jun. 1, 2021, pp. 3.

EPO, Amended description with annotations, in EP 18724911.5, Jun. 1, 2021, pp. 12.

EPO, Claims, in EP 18724911.5, Jun. 1, 2021, pp. 3.

EPO, Description, in EP 18724911.5, Jun. 1, 2021, pp. 12.

EPO, Letter accompanying subsequently filed items, in EP 18724911.5, Jun. 1, 2021, pp. 2.

EPO, Reply to communication from the Examining Division, in EP 18724911.5, dated Jun. 1, 2021, pp. 5.

EPO, Letter accompanying subsequently filed items, in EP 18724911.5, dated May 11, 2021, pp. 2.

EPO, Annex to the communication, in EP 18724911.5, dated Jan. 22, 2021, pp. 3.

EPO, Communication from the Examining Division, in EP 18724911.5, dated Jan. 22, 2021, pp. 2.

\* cited by examiner

DEVICE AND METHOD FOR DETECTION AND LOCALIZATION OF VEHICLES

RELATED APPLICATIONS

This application is a continuation of PCT/EP2018/063560, filed May 23, 2018 and published as WO 2018/215562 A1 and claims priority from EP 17172808.2, filed May 24, 2017, the entire contents of both of which are hereby fully incorporated herein by reference for all purposes.

The invention relates to a method of detecting objects, such as moving vehicles, and to a robot configured to carry out such a method.

Autonomous land-based mobile robots have become an active area of research. The trend is to make such robots drive autonomously or partially autonomously in pedestrian walkways or in road streets, or in both pedestrian walkways and road streets as well as other indoor and outdoor environments. These robots can for example be mobile delivery robots that can deliver goods from a starting point to their respective destination. Such a mobile robot would have to drive through pedestrian sidewalks, vehicle roads, would have to pass cross-roads and drive through other outdoor or indoor environments that it may encounter in its way to the destination.

For example, sidewalk robots may need to cross car roads routinely as a part of planned routes. Depending on traffic regulations, it is possible that cars are not yielding to the robot. In such situations, the robot may sense the cars or other moving objects and react to the motion of the objects.

For such a task of autonomous or partially autonomous driving of mobile robots, among others, it is advantageous that the mobile robots have a method of at least estimating the position of other traffic participants so that the trajectory of movement of the mobile robots can be determined. It is particularly advantageous for such mobile robots to at least estimate the position of other vehicles driving in vehicle roads, when passing a cross-road.

Current state of the art that addresses such a topic includes LIDAR technology and lane markings detection. Further, most of state of the art solutions to such a task are adapted for use in a car that usually drive with relatively high speeds, especially compared to mobile robots configured to drive on pedestrian sidewalks.

Existing systems can use a single sensor, such as laser beams, to obtain information about objects in the environments outside of and around a vehicle. Such a system is described in U.S. Pat. No. 7,202,776B2 "Method and system for detecting objects external to a vehicle".

However, prior art systems and methods for detecting vehicles or other moving objects may have certain drawbacks and limitations. For example, prior art systems may require the usage of relatively sophisticated sensors that are not readily available, and may therefore limit the usage of such systems to high-end products. That is, the prior art may not be applicable for a broad usage.

The present invention seeks to overcome or at least alleviate the shortcomings and disadvantages of the prior art. It is an object of the present invention to provide a technology to determine the location of a movable object, such as a vehicle, and preferably in a fast, efficient, accurate and fail-safe manner.

These objects are met by the present invention.

In a first embodiment, the present invention relates to a method for determining a location of an object. The method comprises processing image data to determine a direction between a camera capturing an image and the object; processing additional data comprising at least one of map data and velocity sensor data; and combining information based on the image data and the additional data to arrive at a location of the object.

That is, different inputs may be used by the present technology. Firstly, the present technology, e.g., the above described method, may use image data. That may be data generated by a camera, e.g., one or more images captured by the camera. One or more objects (e.g., vehicles or cars) may be present on the image(s). Depending on where such objects are located on the image, a direction between the object and the camera may be determined. Furthermore, the present technology also employs additional data to determine the location of the object. It will be understood that just using the image data may lead to ambiguities as to where the object is located. Such ambiguities may be overcome by also taking into account additional data. The additional data may comprise at least one of map data and velocity sensor data. The map data may comprise data relating to roads/streets of an environment. Having such information on roads/streets may help to resolve the ambiguities as to where the object is located (as it is more likely that an object, such as a vehicle or car, is located on a road/street than elsewhere). Alternatively or additionally, velocity sensor data, i.e., data obtained by a velocity sensor, may be used. By using this data (and when using a plurality of images captured at different points of time), one may also arrive at the locations of the objects at the different points of time.

Thus, the present invention provides a method to determine the location of an object by using image data and map data and/or velocity data. That is, in one embodiment, the present invention also uses image data and map data. E.g., when a robot makes use of such an embodiment, in addition to the map data (that may be stored in a storage unit), only images need to be captured. That is, only a camera may be needed as a further input for information. This provides a particularly simple arrangement for determining the location of the object. Corresponding considerations apply in case velocity sensor data is used. This embodiment may need the input from a camera and a velocity sensor, which may also be relatively simple equipment that is readily available. Again, also this embodiment results in a very simple arrangement for determining the location of an object.

The object may be a vehicle, preferably a moving vehicle.

The object may be a car.

The additional data may comprise map data comprising data related to roads, and the step of combining the information to arrive at the location of the object may comprise determining at least one intersection between at least one road and a line corresponding to a direction between the camera and the object to arrive at a possible location of the object.

As discussed, the image data is used to arrive at a direction of the object with respect to the camera taking the image. That is, by this procedure, one may arrive at a line representing possible locations of the object. However, the object may still be located at any point on this line. That is, the location of the object may still be ambiguous. The map data may comprise roads/streets. It will be understood that it is generally more likely that an object, such as a vehicle (e.g., a car) is located on a road/street than in other locations. The points where the line derived by the image data intersects the roads/streets in the map data may therefore be a likely or plausible location of the object. Embodiments of the present invention employ this rationale to arrive at the location of the object in a simple, fast, and efficient manner.

The image data may comprise a plurality of images captured at different points of time.

This may increase the robustness and fail-safety of the employed method. For example, results based on a certain image at a certain point of time may be triangulated with results based on images at different points of time.

The image data may comprise images captured at at least 3 different points of time.

In the step of determining at least one intersection, a plurality of intersections between the at least one road and lines may be determined, wherein the lines correspond to directions between the camera and the object for images captured at different points of time, to arrive at possible locations of the object for different points of time.

The step of combining the information to arrive at the location of the object may comprise selecting a location of the possible locations as the location of the object, wherein this selection step comprises generating speed hypotheses for the object based on the possible locations at different points of time and selecting the location based on the most likely speed hypothesis for the object.

As described above, the direction of the object derived by the image data and the map data may be used to arrive at possible locations of the object (i.e., the points where roads/streets of the map data intersect with the direction line of the image data). However, in case more than one road/street is present, there may be more than one such intersection. Every such intersection may be a possible location for the object.

If using different images captured at different points of time, different possible locations may be present on each such image. It will be understood that the object may have moved between the different images. That is, there is movement hypotheses between possible locations of the object in between the different images. Such movement hypotheses may differ in how likely they are, and embodiments of the present invention may select the location of the object based on the most likely hypothesis.

The most likely speed hypothesis for the object may correspond to the most uniform motion of the object.

That is, it is the motion of the object with the smallest change in velocity.

The additional data may comprise velocity sensor data.

As outlined above, this may also lead to a particularly simple and robust method for determining the location of an object.

In the step of processing image data, a plurality of lines corresponding to directions between the camera and the object at different points of time may be determined; and in the step of combining information to arrive at a location of the object, at least one spatial vector may be fitted in between the lines, which spatial vector depends on the velocity sensor data and a time difference between the different points of time.

The velocity sensor data may be based on a measurement by a Doppler radar sensor.

This may be a particularly simple and readily-available sensor type.

The velocity sensor data may be one-dimensional data corresponding to a velocity of the object towards the Doppler radar sensor.

In the step of processing image data, at least three lines corresponding to directions between the camera and the object at at least three different points of time may be determined; and the step of combining information to arrive at a location of the object may comprise fitting spatial vector hypotheses in between the lines, the spatial vector hypotheses having a vector component depending on the velocity sensor data and a time difference between the different points of time, and identifying a most likely spatial vector hypothesis; wherein the most likely spatial vector hypothesis corresponds to the spatial vector hypothesis having the identical spatial vector hypothesis connecting a first point on a first line to a second point on a second line, and the second point on the second line to a third point on a third line.

The method may further comprise processing data relating to an orientation of the object.

The step of processing data relating to an orientation of the object may comprise using an object detector configured to detect objects with a predetermined orientation.

A time difference between the different points of time may be in the range of 0.01 to 1 seconds, preferably 0.05 to 0.5 seconds.

The method may further comprise determining a distance of the object based on a size of the object in the image data.

This is based on the rationale that the larger an object appears on an image, the closer it is. If, for example, one intends to determine the location of a car, one may roughly estimate that its height is approximately 1.5 m. When using such an estimate for the height, it may be possible to determine an approximate distance of the car from the camera based on the pixel height the car has in the image.

The method may further comprise the step of a camera capturing the images corresponding to the image data.

The camera may be comprised by a robot.

The robot may be a land-based robot.

The robot may be configured not to travel with a speed exceeding 10 km/h.

Such a robot may be particularly safe and fail-safe. As an initial matter, it will be understood that such a speed limitation may result in only a relatively low maximum kinetic energy. That is, even if such a robot would be involved in an accident, such an accident may not have severe consequences, already for the limited speed of the robot. Furthermore, by the robot only travelling at limited speeds, the environment of the robot may also not change as rapidly as would be the case if the robot traveled with a greater speed. This may also facilitate its operation, and particularly the detection of other objects with respect to the robot.

The robot may weigh less than 50 kg.

The steps of processing image data, processing additional data, and combining information may be carried out by a processing component.

The robot may comprise the processing component.

According to a second embodiment, the present invention also relates to a robot. The robot comprises a processing component configured to carry out the method discussed above.

It will be understood that the robot may have advantages corresponding to the advantages discussed above with respect to the method.

The robot may be a land-based robot.

The robot may be configured not to travel with a speed exceeding 10 km/h.

The robot may weigh less than 50 kg.

The robot may further comprise a velocity sensor.

The velocity sensor may be a Doppler radar sensor.

The robot may further comprise a camera to generate the image data.

That is, in certain embodiments, the present teaching presents a device and a method for vehicle detection. A combination of features extracted from data received from two different sensors may be used, the sensors being cameras and Doppler radars. This makes it possible for a mobile robot to generate an accurate estimate of a vehicle using only cameras and Doppler radars. Further road map data can be used to further improve the accuracy of estimation of vehicle position. This may make it possible to get such a position without the need of using further information (e.g., additional estimates of the distance of the car from the camera). To sum up, the present teaching provides a device and a method able to localize a vehicle fast, efficiently and accurately.

Put differently still, the present invention relates to a method and system for fast, efficient and accurate detection of objects, such as cars. Embodiments of the invention relate to a mobile robot. More particularly still, the invention relates to a mobile robot adapted to safely crossroads by accurately perceiving all the fast moving object such as cars.

It will be understood that the described technology may be used as a collision avoidance system, and may be used as a sensing system for controlling autonomous vehicles.

Furthermore, it is noted that the robot may be a fully or partially autonomous robot. In a fully autonomous mode, a control algorithm of the robot needs to make decisions about crossing the road only if it will not lead to a collision with a car. That is, the above described method may be used in a fully autonomous robot, i.e., in a robot travelling without the control of a human operator. In such a case, the method may provide an input signal for road crossing initiation to robot's control algorithm.

It is also possible that robot is controlled remotely by an operator, i.e., that the robot is a partially autonomous robot. In this case, an operator makes numerous decisions directed to the safe operation of the robot. Yet, the operator's ability to perform all of these functions can become compromised due to fatigue, inattention, or other factors such as visibility or connection lag, that reduce the reaction time needed to successfully avoid collisions. In such use cases, the described technology can warn the operator and block operator's control action that initiates road crossing.

Overall, embodiments of the present invention fuse good characteristics of different inputs/sensors: direction from camera images and speed from doppler radar (at least in some embodiments). Furthermore, embodiments of the present invention also relate to a combination of sensor data with road map data: This makes it possible to get a precise location even without the measure of distance to the object. Generally, the present invention provides a very fast, efficient and accurate localization of objects, such as cars, potentially being dangerous, e.g., for a robot.

The present invention is also defined by the below embodiments.

Below, method embodiments will be discussed. These embodiments are identified by the letter "M" followed by a number. Whenever reference is herein made to method embodiments, these embodiments are meant.

M1. A method for determining a location of an object, the method comprising
  processing image data to determine a direction between a camera capturing an image and the object;
  processing additional data comprising at least one of map data and velocity sensor data; and
  combining information based on the image data and the additional data to arrive at a location of the object.

M2. The method according to the preceding embodiment, wherein the object is a vehicle, preferably a moving vehicle.

M3. The method according to the preceding embodiment, wherein the object is a car.

M4. The method according to any of the preceding embodiments with the features of embodiment M2, wherein the additional data comprises map data comprising data related to roads, wherein the step of combining the information to arrive at the location of the object comprises
  determining at least one intersection between at least one road and a line corresponding to a direction between the camera and the object to arrive at a possible location of the object.

M5. The method according to any of the preceding embodiments, wherein the image data comprises a plurality of images captured at different points of time.

M6. The method according to any of the preceding embodiments with the features of embodiment M5, wherein the image data comprises images captured at at least 3 different points of time.

M7. The method according to any of the preceding embodiments and with the features of embodiments M4, wherein in the step of determining at least one intersection, a plurality of intersections between the at least one road and lines are determined, wherein the lines correspond to directions between the camera and the object for images captured at different points of time, to arrive at possible locations of the object for different points of time.

M8. The method according to the preceding embodiment, wherein the step of combining the information to arrive at the location of the object comprises selecting a location of the possible locations as the location of the object, wherein this selection step comprises generating speed hypotheses for the object based on the possible locations at different points of time and selecting the location based on the most likely speed hypothesis for the object.

M9. The method according to the preceding embodiment and with the features of embodiment M6, wherein the most likely speed hypothesis for the object corresponds to the most uniform motion of the object.

That is, it is the motion of the object with the smallest change in velocity.

M10. The method according to any of the preceding embodiments, wherein the additional data comprises velocity sensor data.

M11. The method according to the preceding embodiment and with the features of embodiment M5,
  wherein in the step of processing image data, a plurality of lines corresponding to directions between the camera and the object at different points of time are determined;
  wherein in the step of combining information to arrive at a location of the object, at least one spatial vector is fitted in between the lines, which spatial vector depends on the velocity sensor data and a time difference between the different points of time.

M12. The method according to any of the 2 embodiments, wherein the velocity sensor data is based on a measurement by a Doppler radar sensor.

M13. The method according to the preceding embodiment, wherein the velocity sensor data is one-dimensional data corresponding to a velocity of the object towards the Doppler radar sensor.

M14. The method according to the preceding embodiment and with the features of embodiment M6,
  wherein in the step of processing image data, at least three lines corresponding to directions between the camera and the object at at least three different points of time are determined;
  wherein the step of combining information to arrive at a location of the object comprises fitting spatial vector hypotheses in between the lines, the spatial vector hypotheses having a vector component depending on the velocity sensor data and a time difference between the different points of time, and identifying a most likely spatial vector hypothesis;

wherein the most likely spatial vector hypothesis corresponds to the spatial vector hypothesis having the identical spatial vector hypothesis connecting a first point on a first line to a second point on a second line, and the second point on the second line to a third point on a third line.

M15. The method according to any of the preceding embodiments, wherein the method further comprises processing data relating to an orientation of the object.

M16. The method according to the preceding embodiment, wherein the step of processing data relating to an orientation of the object comprises using an object detector configured to detect objects with a predetermined orientation.

M17. The method according to any of the preceding embodiments with the features of embodiment M5, wherein a time difference between the different points of time is in the range of 0.01 to 1 seconds, preferably 0.05 to 0.5 seconds.

M18. The method according to any of the preceding embodiments, wherein the method further comprises determining a distance of the object based on a size of the object in the image data.

M19. The method according to any of the preceding embodiments and further comprising the step of a camera capturing the images corresponding to the image data.

M20. The method according to the preceding embodiment, wherein the camera is comprised by a robot.

M21. The method according to the preceding embodiment, wherein the robot is a land-based robot.

M22. The method according to the preceding embodiment, wherein the robot is configured not to travel with a speed exceeding 10 km/h.

M23. The method according to any of any of the preceding embodiments and with the features of embodiment M20, wherein the robot weights less than 50 kg.

M24. The method according to any of the preceding embodiments, wherein the steps of processing image data, processing additional data, and combining information are carried out by a processing component.

M25. The method according to the preceding embodiment and with the features of embodiment M20, wherein the robot comprises the processing component.

Below, robot embodiments will be discussed. These embodiments are identified by the letter "R" followed by a number. Whenever reference is herein made to method embodiments, these embodiments are meant.

R1. A robot comprising a processing component configured to carry out the method according to any of the preceding method embodiments.

R2. The robot according to any of the preceding robot embodiments, wherein the robot is a land-based robot.

R3. The robot according to any of the preceding robot embodiments, wherein the robot is configured not to travel with a speed exceeding 10 km/h.

R4. The robot according to any of the preceding robot embodiments, wherein the robot weights less than 50 kg.

R5. The robot according to any of the preceding robot embodiments, wherein the robot further comprises a velocity sensor.

R6. The robot according to any of the preceding robot embodiments, wherein the velocity sensor is a Doppler radar sensor.

R7. The robot according to any of the preceding robot embodiments, wherein the robot further comprises a camera to generate the image data.

R8. The robot according to any of the preceding embodiments, wherein the robot is an autonomous or partly autonomous robot.

The present invention will now be described with reference to exemplary drawings, which are intended to exemplify, and not to limit, the scope of the present invention.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

The description of the figures first provides a general overview of embodiments of the present invention, before providing further details of more specific embodiments, features and steps of the exemplary embodiments of the present invention.

Embodiments of the present invention relate to methods and systems comprising a mobile robot 100 (see FIG. 1) that may travel autonomously (without a human operator controlling it) or semi-autonomously (with a human operator only controlling it at some times during its operation). Such a robot 100 may travel (i.e., drive) in public environments, e.g., on sidewalks. It may sometimes be required to cross-roads. Both for its operation on the sidewalk and to cross-roads, it may be desirable for the robot 100 to be able to determine the location and optionally also the speed of other traffic participants, such as vehicles (e.g., cars).

Figure 7A:
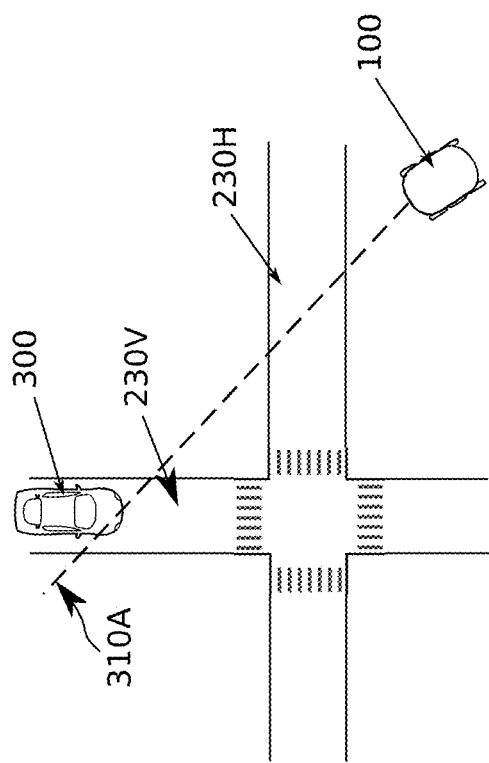
FIG. 7A shows a scenario for illustrating the detection and localization of a vehicle in a first position by the mobile robot.
Figure 7B:
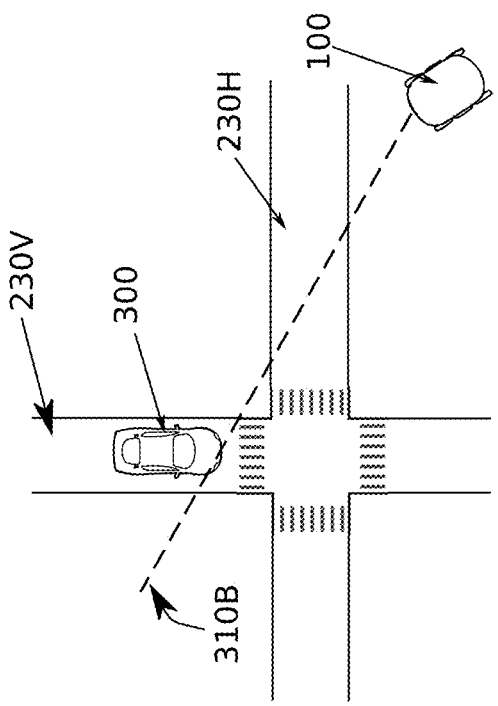
FIG. 7B shows a scenario for illustrating the detection and localization of a vehicle in a second position by the mobile robot.

An exemplary situation of a robot 100 operating in such an environment is depicted in FIGS. 7A and 7B in a top view. The two Figures depict a situation in two different times. I.e., FIG. 7A depicts a situation at a first time, and FIG. 7B depicts the situation at a later second time being different from the first time by a certain time difference (e.g., 0.2 seconds).

Both FIGS. 7A and 7B depict the robot 100 and a vehicle 300, as well as two roads 230V, 230H that cross each other at an intersection. As can be seen, the vehicle 300 has moved between the two FIGS. 7A and 7B, i.e., its location in FIG. 7B is different from its location in FIG. 7A. The robot 100 has not moved. While some of the embodiments described herein relate to a robot 100 that has not moved, it should be understood that this is for simplicity and brevity of description only, and that it is also possible to have the robot 100 moving.

As discussed, it may be desirable to provide a technology allowing the location of the vehicle 300 to be determined with minimal sensor requirements.

Figure 3:
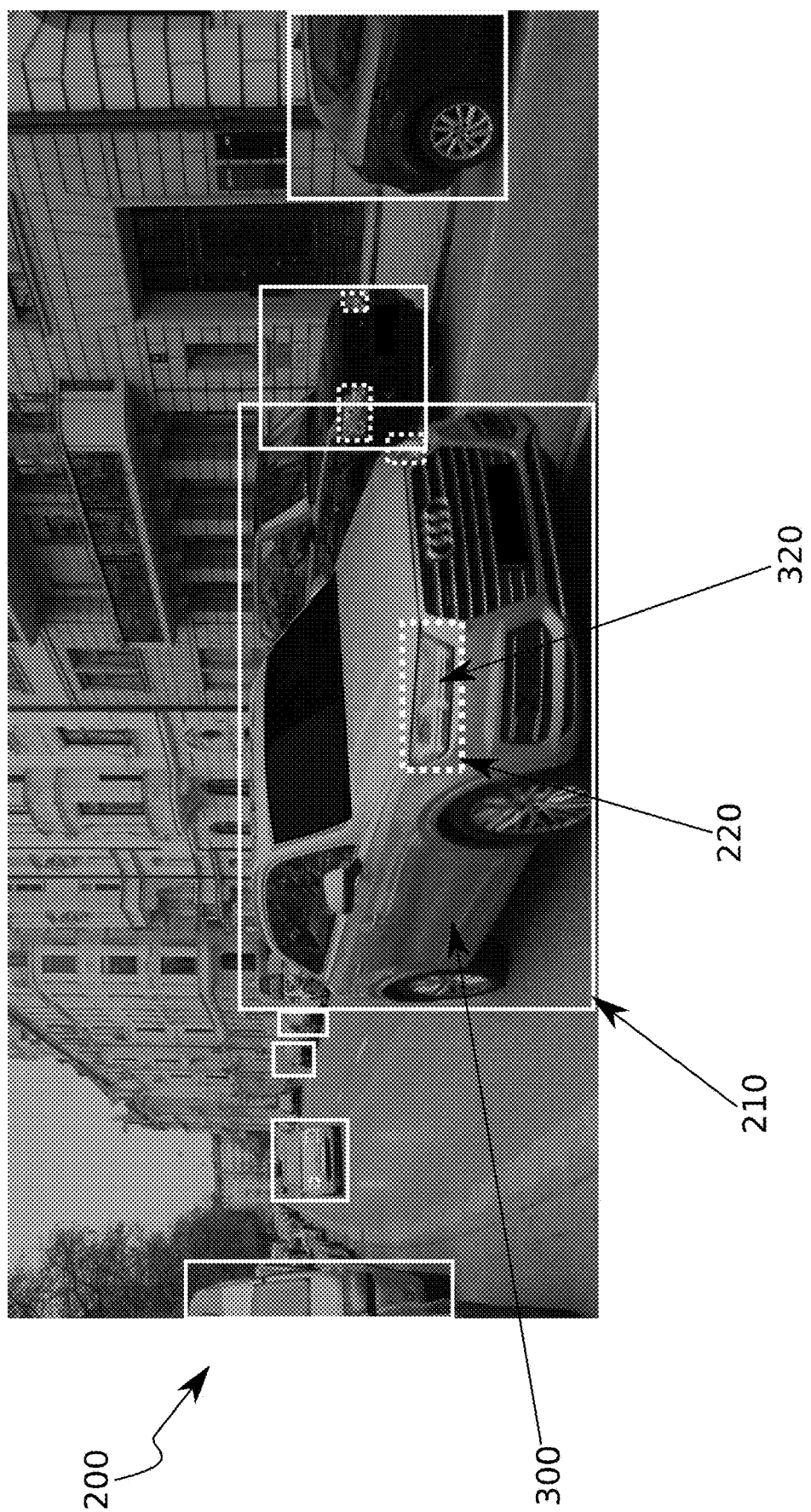
FIG. 3 depicts an embodiment of vehicle detection on an exemplary image.

The robot 100 may comprise a camera (see, as a mere example, camera 10 in FIG. 1) configured to take pictures of the environment of the robot 100. A mere example of such an image taken by the camera is shown in FIG. 3. The image that the camera takes may provide information on a direction a vehicle 300 has with respect to the camera. That is, if a first object is hidden behind a second object (on an image taken by the camera), both objects are located in the same direction with respect to the camera. That is, by using a camera only, one arrives at a direction of an object (such as a vehicle) with respect to the camera. This is also depicted by the dotted line 310A in FIGS. 7A and 8A, the latter one showing a schematic representation of the situation of FIG. 7A. However, by only using the data obtained from one simple image, it may be difficult or impossible to determine the location of the vehicle 300—that is, the vehicle 300 may be located at any point on the dotted line 310A.

A corresponding procedure is performed for a subsequent image taken in the situation depicted in FIG. 7B. By this, again, a line 310B representing the direction of the vehicle 300 with respect to the camera may be obtained, but by merely using this information, it may be difficult to determine the location of the vehicle 300.

Embodiments of the present invention use additional data to determine the location of the vehicle present in different images.

In one embodiment, the present technology also uses map data. That is, both the data obtained by the image and additional map data is used. Map data may include information on roads of the environment the robot 100 is currently travelling in. For example, the map data may include the roads 230V and 230H depicted in FIGS. 7A to 8B. By also using the map data, one may exclude most of the locations that are possible by only using the image data. Following the rationale that it is probable that a vehicle travels on a road, only the location hypotheses 231V and 231H (see FIG. 8A) may be likely locations for the situation depicted in FIGS. 7A and 8A. Following the same rationale, only location hypotheses 231V' and 231H' may be likely hypotheses for the situation depicted in FIGS. 7B and 8B. By using the map data (from which the distances between the likely hypotheses may be derived) and by using the time difference between first and second images, one may also arrive at velocities that depend on the location hypotheses. For example, depending on the velocities, one pair of hypotheses for the locations may be more plausible than another. Furthermore, it will be understood that also further images captured at still different times, may be used. Overall, combining the image data (resulting in the directions of the vehicle with respect to the camera) of images taken at different times with the map data may be used to determine the location of a vehicle.

Figure 11:
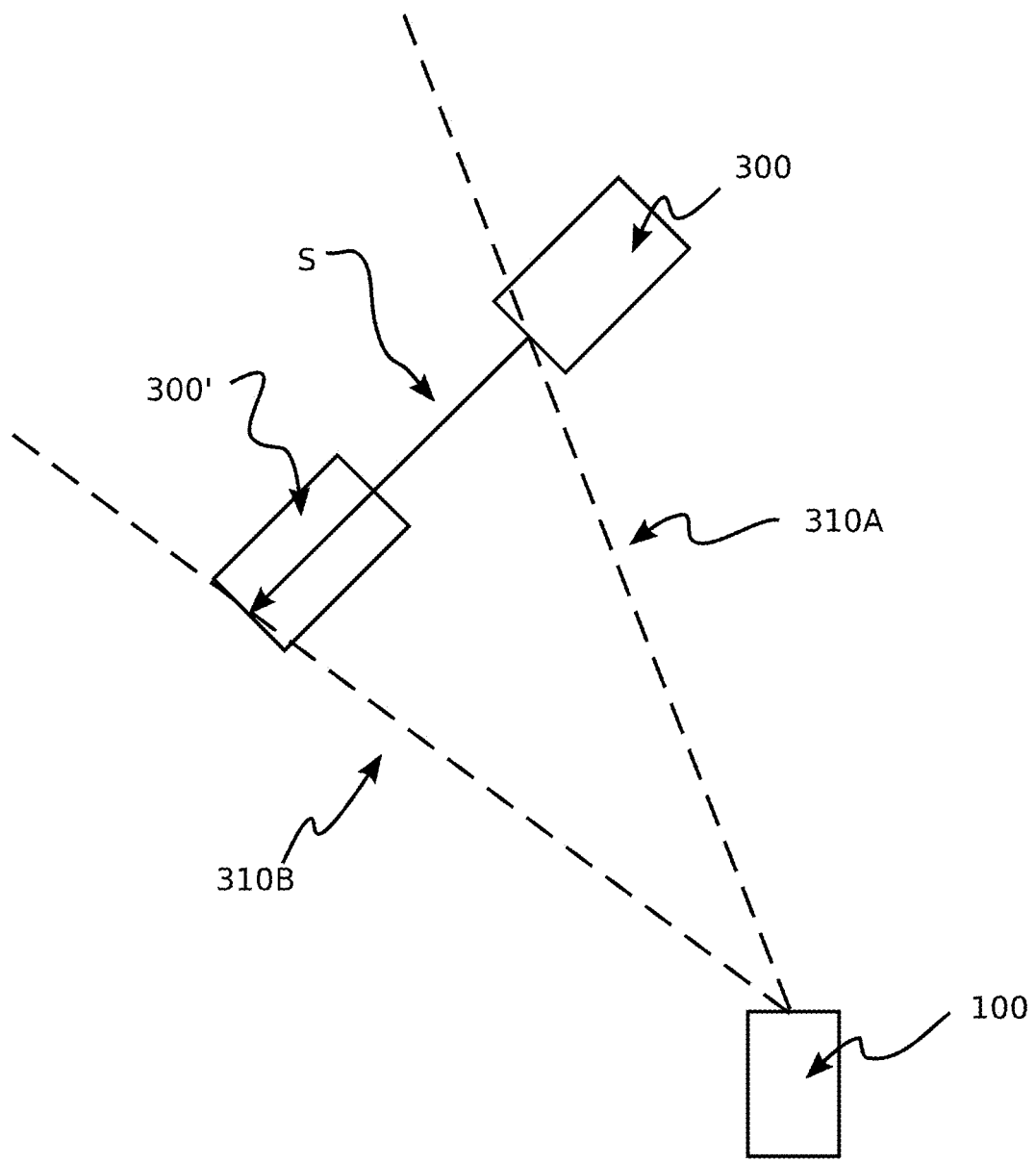
FIG. 11 schematically depicts a further scenario for illustrating the localization of a vehicle.

In some embodiments, i.e., alternatively or additionally to using the map data, the present technology may also use data of a velocity sensor. This is further illustrated by FIG. 11. FIG. 11 depicts the situations of FIGS. 7A and 7B from the perspective of the robot 100. The first image of the vehicle 300 is taken at the first point of time and the second image of the vehicle 300' is taken after the described time difference. Thus, the dotted lines 310A, 310B again represent the direction of the vehicle 300, 300' with respect to the robot 100 at the first and second points of time, respectively. Again, just by the image data, the vehicle 300 may be positioned at any point along dotted line 310A at the first point of time and at any position along the dotted line 310B at the second point of time. When also using the velocity, one also obtains data relating to the velocity vector of the vehicle. Multiplying this vector with the time difference between first and second images results in a spatial vector S. It will be understood that a vector S clearly determines the positions of the vehicle 300 along the first and second dotted line 310A, 310B. Put differently, a given vector S only "fits" in between the dotted lines 310A, 310B at one combination of points along the dotted lines 310A, 310B, thereby identifying the points where the vehicle 300 is located at the first and second time. Thus, also by means of this rationale, one can determine the location of a vehicle 300 with respect to the camera.

Figure 12:
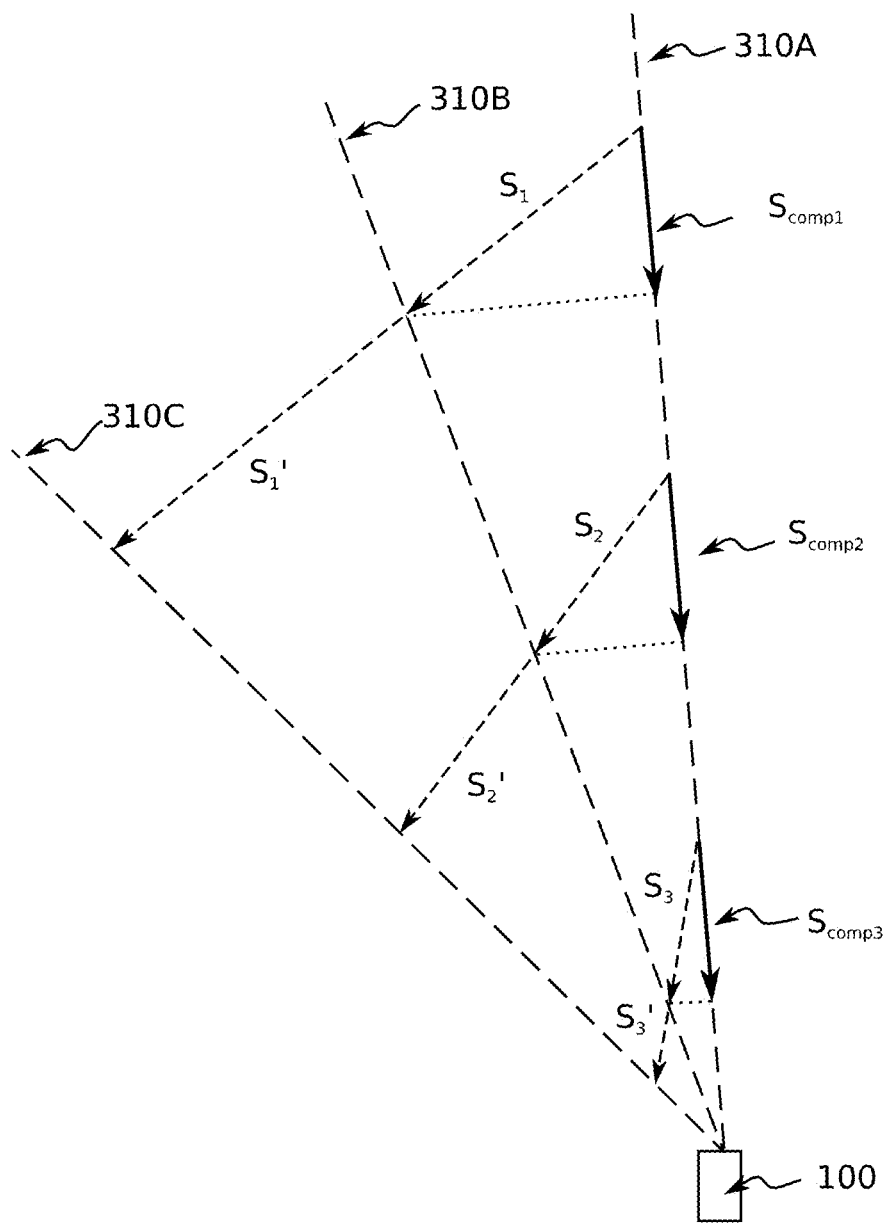
FIG. 12 schematically depicts a still further scenario for illustrating the localization of a vehicle.

A further variant of this also uses data obtained from a Doppler radar sensor. Such a Doppler radar sensor typically provides information on one component of the velocity vector of the vehicle, i.e., the component of the velocity vector towards the Doppler radar sensor. This is also depicted in FIG. 12. FIG. 12 again schematically depicts a robot 100 with a camera and dotted lines 310A, 310B, and newly also 310C, corresponding to first, second, and third directions of a vehicle (not depicted in FIG. 12) at first, second, and third points of time. Again, these directions between the vehicle and the robot 100, or, more particularly, a camera of the robot 100, can be determined by image data. Furthermore, a spatial vector $S_{comp}$ is depicted. More particularly, three possible spatial vectors $S_{comp1}$, $S_{comp2}$, $S_{comp3}$ are depicted.

As described, with a Doppler radar sensor, a velocity of the vehicle towards the Doppler radar sensor may be determined. Thus, a velocity component towards the robot 100 can be determined by means of the Doppler sensor. With knowledge of a time interval (e.g., the time difference between the different images of the camera), this velocity vector may be transformed to a spatial vector. This spatial vector is depicted as $S_{comp}$. It corresponds to the component towards the robot 100 of the spatial movement vector of the vehicle between two images. It will be understood that this spatial movement component vector $S_{comp}$ can be fitted between dotted lines 310A, 310B at numerous different locations (as one is free to choose the component of the spatial vector perpendicular to $S_{comp}$). This is further illustrated by spatial movement vectors $S_1$, $S_2$, $S_3$ having the components $S_{comp1}$, $S_{comp2}$, $S_{comp3}$, respectively, in the direction of the robot 100. These spatial movement vectors $S_1$, $S_2$, $S_3$ are depicted at various locations to connect dotted lines 310A and 310B. While 3 such possible connections between 310A and 310B are depicted in FIG. 12, it is noted that they are merely exemplary and that numerous (actually, an infinite number of) other connections between the dotted lines 310A, 310B are also possible, when just knowing the component $S_{comp}$ of the spatial connection vector. The corresponding full (or, actually, two-dimensional) spatial movement vector is identified as $S_1$, $S_2$, and $S_3$, respectively, in FIG. 12.

The described ambiguity may be removed by also taking into account the direction between the vehicle and the robot 100 derived by the image at the third point of time (i.e., the direction corresponding to dotted line 310C in FIG. 12). When considering the full spatial movement vector $S_1$ and assuming a linear motion of the vehicle (i.e., assuming that the vehicle does not change its direction of movement, which may be a reasonable assumption, in particular when the time difference between the different images is relatively small), one arrives at the conclusion that the vehicle has moved by the spatial movement vector $S_1'$ between the images 2 and 3. Correspondingly, under the same assumptions, but when considering full spatial movement vector $S_2$ and $S_3$, one arrives at spatial movement vectors $S_2'$, and $S_3'$ between the second and third images, respectively. As can be seen, the magnitudes of the vectors satisfy:

$$|S_1'| > |S_1|$$

$$|S_2'| = |S_2|$$

$$|S_3'| < |S_3|$$

In other words, assuming that the time difference between the first and the second image, and the second and the third image is equal to each other, only the pair $S_2$, $S_2'$ corresponds to a constant velocity of the vehicle. For the pair $S_1$, $S_1'$, the velocity between images 2 and 3 is greater than between images 1 and 2 and for the pair $S_3$, $S_3'$, the velocity between images 2 and 3 is smaller than between images 1 and 2.

That is, when assuming a constant velocity of the vehicle (with regard to both magnitude of the velocity and direction of the velocity) in the time between images 1 and 3, the three images (providing the directions of the vehicle with respect to the robot 100) and the velocity component obtained by the Doppler radar sensor are sufficient to determine the location of the vehicle at the times the first, second, and third images are taken. That is, the combination of image data and data obtained by Doppler radar sensor may be used to determine a location of the vehicle.

It will be understood that the above described procedures may be used to determine the location of a vehicle 300 with a certain accuracy depending, inter alia, on the equipment used and on other parameters (such as the time difference between the images that are taken). To further improve the accuracy, the present technology may also combine the above described data. That is, embodiments of the present technology may use the image data, the map data and the data of the velocity sensor (e.g., the Doppler radar sensor), to arrive at an even more precise localization of the vehicle.

That is, embodiments of the present invention combine map data (that may be public) with common sensory data from usual cameras and Doppler radars. The robot 100 may "know" its position and orientation (i.e. pose) relatively precisely. This may make it possible to find out a very accurate location and speed estimates of all the nearby vehicles (such as cars) in computationally efficient and fast way. It is done by first finding a direction to a distant object relative to the current robot pose, e.g., by means of the image data.

First, positions and directions of cameras which are mounted on the robot may be measured, and camera parameters may be calibrated so that it is possible to transform pixel coordinate on an image to a direction vector relative to robot's reference frame. If the robot 100 is stationary, objects pixel positions can be found with a simple subtraction of consecutive frames which results in a motion detector. In this particular case, larger blobs (differences in the locations of objects) can be considered as possible fast moving objects. If a robot is moving, simple object recognition systems can find accurate bounding boxes to all the cars or even part of the car (such as a headlight) can be used to accurately estimate the direction to a car. Object recognition method on images can be based on template matching, deformable parts models, neural networks. Alternatively or additionally, headlight detection may be used. It can be based on image brightness thresholding with blob detection. Any of these measures can be used to determine the presence of an object (e.g., a vehicle) on an image taken by a camera of the robot 100. Thus, a direction of an object with respect to the camera (or, more generally, the robot 100) can be determined.

In one embodiment, in addition to this image data, map data is used. A direction to a distant object can intersect a map in several locations. This provides accurate estimates for possible vehicle locations using just one frame of data. This process may be repeated at the next frame. This may make it possible to get possible movements of cars on car roads, but may also result in some ambiguities. This ambiguity can be solved by also using radar measurements from the same region. E.g., radar measurement should coincide with the estimated speed vector from two consecutive frames.

That is, an embodiment of the present invention may use image data and at least one of (and preferably two of) map data and Doppler radar data.

Further features of individual embodiments of the present technology will now be described.

The device and method described herein correspond to a mobile robot 100 that can be configured to detect a moving object, such as a vehicle 300 (e.g., a car). Further the mobile robot 100 can be configured to localize the vehicle 300. That is, the mobile robot 100 can be configured to find the position, i.e. the coordinates with respect to a coordinate system, of the vehicle 300. Further, the mobile robot 100 may be configured to obtain a pose, i.e. position and orientation, of the vehicle 300, with respect to a reference system. The localization can be done with respect to an absolute coordinate system, (such as GPS coordinates) or a relative coordinate system (such as localization with respect to some known location and or object, such as the mobile robot 100 itself). The coordinate system can be chosen arbitrarily, as long as it is coherent and consistent and can be converted to some standard coordinate system (such as WGS84) if needed. Thus, throughout the document, unless otherwise specified by the context, whenever referring to the localization of the vehicle 300 and the localization of the mobile robot 100, the upper mentioned notes about the coordinate system may apply. A preferred coordinate system can be a Cartesian coordinate system with its origin on the center of the mobile robot 100. Another preferred coordinate system can be a Cartesian coordinate system with its origin on the sensors, such as each sensor generates data based on its own coordinate system. On a later stage, such data taken from the sensors can be translated into a coherent coordinate system for each of the sensors and the mobile robot 100.

It should be noted that for the sake of clarity and understandability the term "vehicle" (referred also with the numeral 300) is chosen as a localization target. The device and method described herein can also be configured for detecting and localizing other objects and/or people, such as pedestrians, vehicles of different sizes and types, bicycles, or other traffic participants. Detecting and localizing vehicles 300, as implied by its definition, represents only a preferred embodiment of the device and method described herein.

Figure 1:
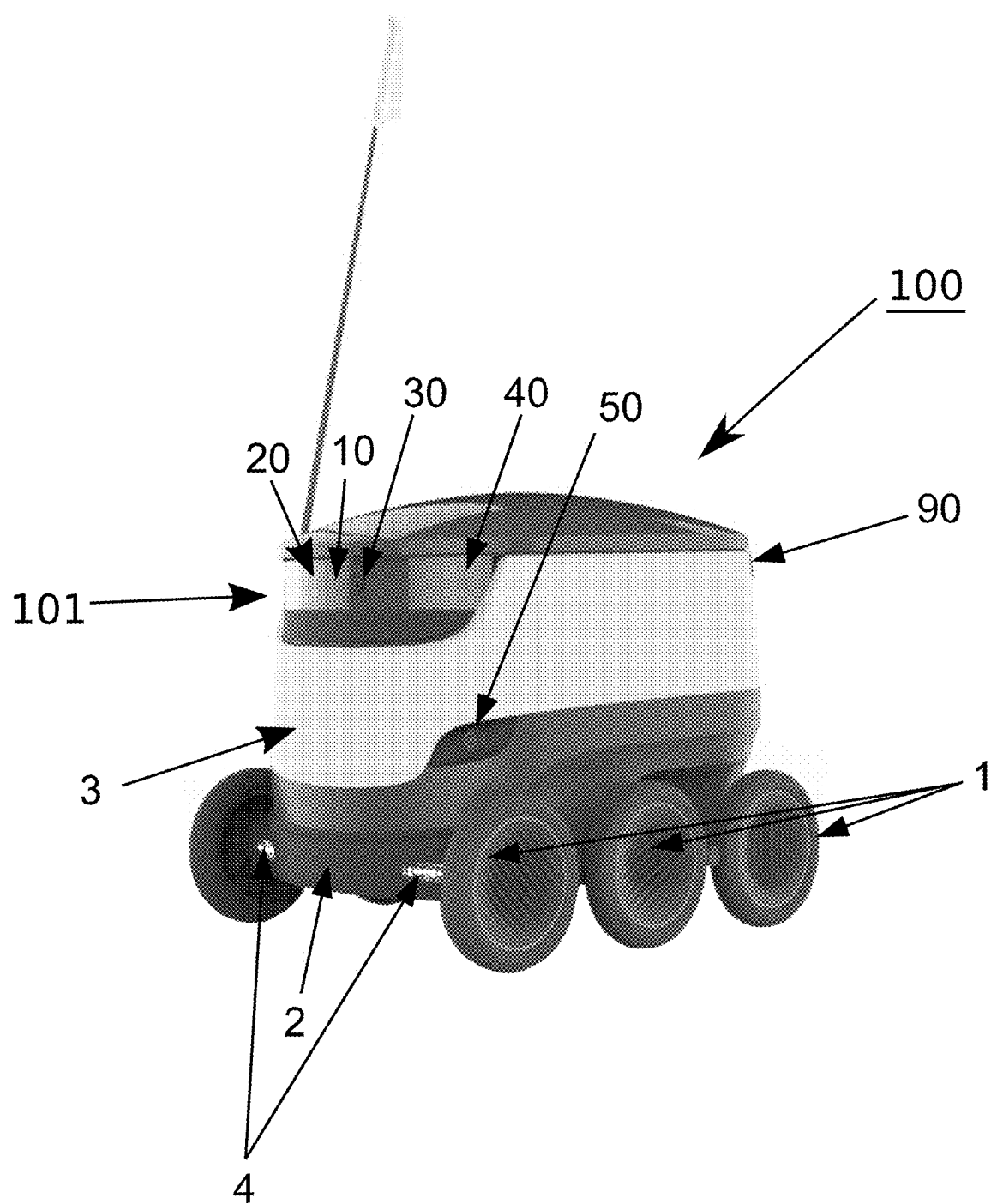
FIG. 1 shows a perspective view of a mobile robot embodiment in accordance with the present invention.

FIG. 1 shows an embodiment of the robot 100 according to the invention. The robot 100 can comprise wheels 1 adapted for land-based motion. The wheels 1 can be mounted to a frame 2. A body 3 can be mounted on the frame 2. Body 3 can comprise an enclosed space (not shown), that can be configured to transport a delivery. At least one light 4, preferably a plurality of lights 4, such as two lights 4, can be placed around body 3 and/or frame 2. Lights 4 can for example be LED lights and can illuminate the environment in which the robot 100 finds itself. This can be useful to indicate the presence of the robot 100 in the dark and/or assist visual localization by better illumination. At least one camera 10, 20, 30, 40, 50, preferably plurality of cameras 10, 20, 30, 40, 50, can be placed around body 3. Such cameras 10, 20, 30, 40, 50 can be configured for capturing images of the surroundings of the mobile robot 100, such as at least one of the front view, the side views and the back view of the mobile robot 100. In an exemplary embodiment, the mobile robot 100 can comprise one camera 10 on the front of the mobile robot 100, relative to the normal forward direction of the mobile robot 100. Such camera 10 can capture an image of the environment in front of the robot 100. In such a case the robot 100 can be capable of detecting a vehicle 300 positioned in front of mobile robot 100. In yet another exemplary embodiment, the mobile robot 100 can have at least one camera, such as a 360° view camera, and/or a plurality of cameras 10, 20, 30, 40, 50. Such cameras 10, 20, 30, 40, 50 can be adapted to capture images of the environment surrounding the mobile robot 100. That is, the robot 100 can be configured to capture images corresponding to the front, side and back view of the environment surrounding the robot 100. In such an exemplary embodiment, the mobile robot 100 can be capable of detecting a car positioned in any direction, relative to the mobile robot 100.

In this particular embodiment depicted in FIG. 1, nine cameras are present. A first camera 10 can be positioned near the front of the robot 100 on the body 3. The first camera 10 can provide an approximately horizontal view away from the robot 100. A second camera 20 and a third camera 30 are positioned on the two sides of the first camera 10 similarly near the front of the robot 100.

Second camera 20 and third camera 30 can be angled 10-50° downwards, preferably 20-40° downwards with respect to the first camera's 10 orientation, i.e. they can be angled downwards with respect to a horizontal view. Second camera 20 and third camera 30 can be stereo cameras. They can be separated by a distance of 5-10 cm. The stereo cameras facilitate triangulation of objects by comparing the features present on the visual images from the stereo cameras.

A fourth camera 40 and a fifth camera 50 are placed on the left side of the robot's body 3 with respect to a forward direction of motion. The fourth camera 40 and the fifth camera 50 can also be stereo cameras. They can be separated by a distance of 15-20 cm.

On the right side of the robot's body 3 with respect to the direction of motion, a sixth camera (not shown) and a seventh camera (not shown) are placed in a position that is complementary to positions of cameras 40 and 50. The sixth camera and the seventh camera can also be stereo cameras preferably separated by a distance of 15-20 cm.

On the back of the robot 100, an eighth camera (not shown) and a ninth camera can be placed. The eighth camera and the ninth camera can also be stereo cameras preferably separated by a distance of 5-10 cm, though these cameras may also be realized as "normal", non-stereo cameras. One or more cameras can be arranged in a portrait orientation. This means that the vertical viewing angle can be larger than the horizontal one. In the shown embodiment, the side cameras 40, 50 can be placed in a portrait orientation. The other cameras 10, 20, 30 can be placed in a landscape orientation. This means that the horizontal viewing angle can be larger than the vertical one.

Figure 2:
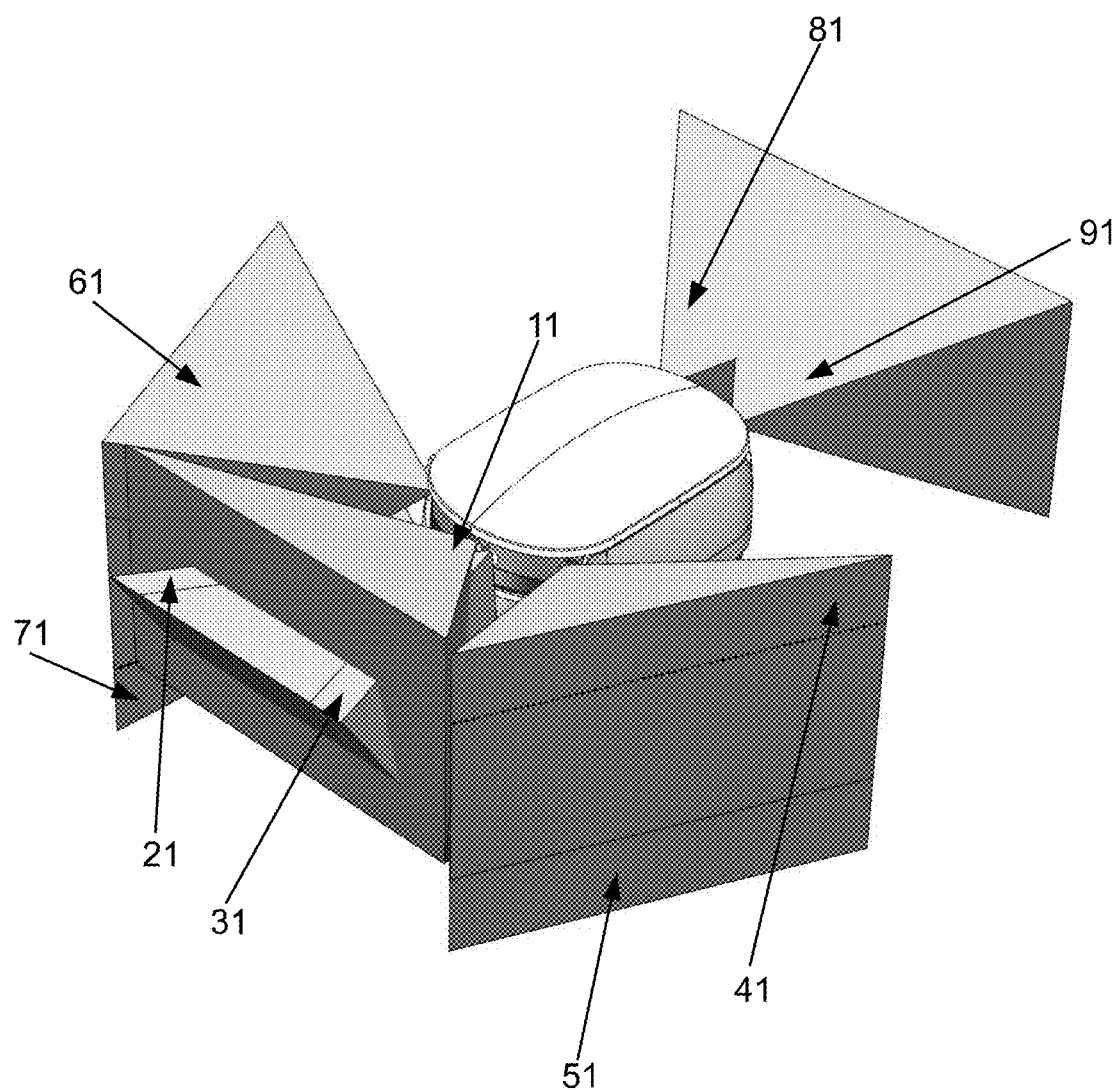
FIG. 2 shows different camera viewing angles of the mobile robot according to an embodiment.

FIG. 2 shows an embodiment of the robot 100 according to the invention. FIG. 2 demonstrates viewing angles of a camera setup as shown in FIG. 1. All of the cameras' viewing angles are shown. The viewing angles can be in the range of 40-80° by 60-100°, preferably about 60° by 80°. The viewing angle 11 corresponds to the first camera 10. The viewing angles 21 and 31 correspond to the cameras 20 and 30 respectively. Those two cameras can be arranged in a stereo manner, which is why FIG. 2 demonstrates the viewing angles intersecting. A similar arrangement can be achieved with the back cameras—these can also be stereo cameras placed towards the back of the robot 100 on its body 3, though in other embodiments, they can also be realized as normal cameras. Therefore, viewing angles 81 and 91 corresponding to the back cameras respectively are also shown as intersecting. The two pairs of side cameras can be placed in a stereo position in a portrait orientation. Their viewing angles 41 and 51, and 61 and 71 respectively similarly intersect. It will be understood that at a certain distance, the cones defined by the viewing angles 11, 41, 61, 81, 91 will overlap, resulting in a 360° view of the robot 100, rendering the operation of the robot particularly safe, as all objects in the environment around the robot may be detected.

It should be noted that in FIG. 1 and FIG. 2 a particular embodiment of a mobile robot 100 comprising a specific camera setup is shown. It should be noted that the mobile robot 100 can comprise any of the cameras shown in FIG. 1. The mobile robot 100 can comprise at least one camera placed in any position around body 3 of the mobile robot 100. In such embodiment, the vehicle detection capability of the mobile robot 100 can be bounded by the field of view of the at least one camera of the mobile robot 100.

FIG. 3 depicts an embodiment of vehicle detection on an exemplary image 200. FIG. 3 demonstrates how the mobile robot 100 can detect at least one vehicle 300 positioned in the vicinity of its current and/or prospective operating area and in the field of view of at least one of its cameras. FIG. 3 illustrates how the mobile robot 100 can find the pixel position of the at least one vehicle 300 on at least one of the images 200 captured by at least one of its cameras 110 (i.e. which of the pixels of the image 200 represent part of vehicle 300).

The mobile robot 100 can be configured to detect at least one vehicle 300, preferably a plurality of vehicles 300, and in particular the vehicles 300 that can intersect the trajectory of movement of the mobile robot 100 in the current and/or prospective operating area of the mobile robot 100. In an embodiment, the mobile robot 100 can detect at least one vehicle 300 positioned in its current and/or prospective operating area. In another embodiment, the mobile robot 100 can detect at least one vehicle 300 positioned in the field of view of its cameras 110. In yet another embodiment, the mobile robot 100 can detect at least one vehicle 300, preferably a plurality of vehicles 300, and can classify them, based on specific features, as capable or not capable of intersecting the trajectory of movement of the mobile robot 100 in the current and/or prospective operating area of the mobile robot 100. In such embodiments, the mobile robot 100 can assign a probability to the detected vehicles 300 based on how probable it is for the detected vehicle 300 to intersect robot's 100 trajectory of movement. In further embodiments, the mobile robot 100 can detect at least one vehicle 300, preferably a plurality of vehicles 300, and to any of the detections the mobile robot 100 can assign a probability that depicts the correctness of vehicle detection. Said correctness of vehicle detection can be related to at least one of, but not limited to, the chances of a detected vehicle 300 being a vehicle, the correctness of the found position of the vehicle 300 compared to the real position of the vehicle 300.

In FIG. 3 the mobile robot 100 can be configured to detect a plurality of vehicles 300. The detection of a vehicle 300 is depicted by the vehicle detection indicator 210. It should be noted that in the depicted embodiment of FIG. 3 the vehicle detection indicator 210 is depicted as a continuous polygon, bounding the vehicles 300. The vehicle detection indicator 210 depicted as a continuous polygon can be done for visualization purposes. In other embodiments, vehicle detection indicator 210 can comprise a set of data, such as a stream of bits, that can indicate the position of at least one detected vehicle 300. The vehicle detection indicator 210 may also be used to derive further information as regards the position of the vehicle 300. For example, the size of the vehicle detection indicator 210 (i.e. the number of pixels it spans in the image) may be a measure for the distance of the vehicle 300 with respect to the camera capturing the image. This may also be used to determine a position of the vehicle 300. The vehicle detection indicator 210, can comprise coordinates related to the position of the vehicle 300 on the image 200. That is, the vehicle detection indicator 210, can comprise the pixel position of the at least one detected vehicle 300, i.e. which of the pixels of the image 200 represent the vehicle 300.

The mobile robot 100, can be further configured to detect at least one vehicle feature 320, preferably a plurality of vehicle features 320, of the vehicle 300. The detection of a vehicle feature 320 is depicted by the vehicle feature indicator 220. It should be noted that in the illustrated embodiment of FIG. 3 the vehicle feature indicator 220 is depicted as a polygon with dotted lines, bounding the vehicle feature 320. The vehicle feature indicator 220 depicted as a polygon with dotted lines can be done for visualization purposes. In other embodiments vehicle feature indicator 220 can comprise a set of data, such as a stream of bits, that can indicate the position of at least one detected vehicle feature 320. As depicted, the vehicle feature indicator 220 may be headlights of the vehicle 300 that are present on an image. Again, the size (e.g., the number of pixels representing them) of such a vehicle feature indicator 220 may be related to the distance of such a vehicle feature indicator 220 to the camera, and may be used to determine the position of the vehicle 300. The vehicle feature indicator 220 can comprise coordinates related to the position of the vehicle feature 320 on the image 200. That is, the vehicle feature indicator 220 can comprise the pixel position of the at least one detected vehicle feature 320, i.e., which of the pixels of the image 200 represent the vehicle feature 320.

In FIG. 3, the vehicle feature 320 corresponds to the lights of the vehicles 300. In an embodiment, the vehicle feature 320 can comprise specific physical parts of the vehicle 300 such as, but not limited to, wheels, lights, turn indicators, break indicators, backward movement indicators. In an embodiment, the vehicle feature 320 can comprise characteristic features of the vehicle 300 such as, but not limited to, color, size, shape, orientation, position, tilting. In yet another embodiment, the vehicle feature 320 can comprise all the upper mentioned features or any combination of the upper mentioned features. In an embodiment, the mobile robot 100 can use the vehicle features 320, for at least improving the detection and/or localization of the vehicle 300. In an example, the mobile robot 100 can use the vehicle features 320, such as the color of vehicle 300, for solving the ambiguities created by multiple vehicles 300, that is, for differentiating between different vehicles 300 on an image 200. In another example, the mobile robot 100 can use the vehicle features 320, such as the headlights of the vehicle 300, for detecting the vehicle 300 using image processing techniques, such as brightness thresholding. Further, the mobile robot 100 can use the vehicle features 320, such as turn indicators, break indicators, backward movement indicators of the vehicle 300, for predicting the path of the vehicle 300 in the very near future.

For detecting at least one vehicle 300 and/or the vehicle features 320, the mobile robot can apply specific image processing algorithms on the images 200 captured by the cameras. That is, the mobile robot can process the captured images 200 in a processing component 150 (refer to FIG. 10) and can find the pixel position of at least one vehicle 300 and/or vehicles feature 320 on the image 200. The processing component 150 can further indicate the detection of a vehicle 300 and/or vehicle feature 320 with a corresponding vehicle detection indicator 210 or vehicle feature indicator 220. In a preferred embodiment, the processing unit 150 can be programmable, more preferably the software that can run on processing unit 150 can be updated. The processing component 150 can comprise at least one processing unit, such as but not limited to: Graphical Processing Unit (GPU), Central Processing Unit (CPU), microcontroller (μC), Digital Signal Processor (DSP), System-on-Chip (SoC). In a preferred embodiment, the processing component 150 can be a System-on-Chip, that comprises proper interface for at least one of uploading, downloading, installing, deleting, updating, debugging, observing a software that can run on the processing component 150. The processing component 150 can comprise a processing unit capable of at least executing an image processing algorithm (i.e. a program for processing an image, a sequence of sentences written in a specific programming language, for example: C, C/C++, Java, Python, Assembly Language, processor specific language, etc.). In a preferred embodiment, such a processing unit can be a processor, such as a general-purpose processor and/or a graphical processing unit GPU. The processing component 150 can also comprise a storage unit configured to store the software that is uploaded on the processing component 150. In a preferred embodiment, the storage can be a main memory such as random access memory and/or a secondary memory such as hard disk drives (HDD) or solid state devices (SSD).

The vehicle detection on the captured images 200 can be based on object recognition algorithms, such as the ones described in Liu W. et al. (2016) SSD: Single Shot MultiBox Detector, in: Leibe B., Matas J., Sebe N., Welling M. (eds) Computer Vision—ECCV 2016, ECCV 2016, Lecture Notes in Computer Science, vol 9905, Springer, Cham; and Joseph Redmon, Santosh Kumar Divvala, Ross B. Girshick, Ali Farhadi: You Only Look Once: Unified, Real-Time Object Detection, CVPR 2016: 779-788. In an embodiment, if the robot 100 is stationary, the vehicle detection can be based on a motion detector algorithm. This can be achieved by a subtraction of consecutive frames (blob detection). That is, at least two images 200 are compared, wherein a time delay exists between the moments the at least two images 200 where captured, such 0.5-5 seconds. Thus, the at least two images 200 were captured for the same environment but on different time moments. The differences (blobs) found by the comparison can represent possible presence of a moving object. Thus, with the help of the detected blobs, a differentiation between the static background and a moving foreground comprising moving objects can be done. The differences (blobs) can further be analyzed to decide if they represent the presence of a vehicle 300 or not. Further, a probability for the chance of the detected frame difference (blob) representing a vehicle 300 can be assigned to each of the found differences (blobs). The differences (blobs) can be analyzed further to extract different features of the vehicles 300, such as vehicle's velocity, direction of movement, size, etc.

In another embodiment, an object recognition algorithm can be used by the mobile robot 100 for accurate detection and localization of vehicles 300 and/or vehicle features 320. Object recognition algorithm can be based on Template Matching, Deformable Parts Model (DPM) and/or Neural Networks (NN), preferably Deep Neural Networks (DNN).

An exemplary Template Matching algorithm that can be used is disclosed by Anish Acharya, Template Matching based Object Detection Using HOG Feature Pyramid, June 2014, obtainable by www.arxiv.org (https://arxiv.org/abs/1406.7120).

An exemplary Deformable Parts Model algorithm that can be used is disclosed by P. F. Felzenszwalb, R. B. Girshick, D. McAllester and D. Ramanan, "Object Detection with Discriminatively Trained Part-Based Models," in IEEE Transactions on Pattern Analysis and Machine Intelligence, vol. 32, no. 9, pp. 1627-1645, September 2010.

An exemplary Deep Neural Network algorithm that can be used is disclosed by Liu W. et al. (2016) SSD: Single Shot MultiBox Detector, in: Leibe B., Matas J., Sebe N., Welling M. (eds) Computer Vision—ECCV 2016, ECCV 2016, Lecture Notes in Computer Science, vol 9905, Springer, Cham. A further exemplary Deep Neural Network algorithm that can be used is disclosed by Joseph Redmon, Santosh Kumar Divvala, Ross B. Girshick, Ali Farhadi: You Only Look Once: Unified, Real-Time Object Detection, CVPR 2016: 779-788.

In another embodiment, headlights of a vehicle 300 can be detected based on a combination of image brightness thresholding and blob detection.

Figure 4:
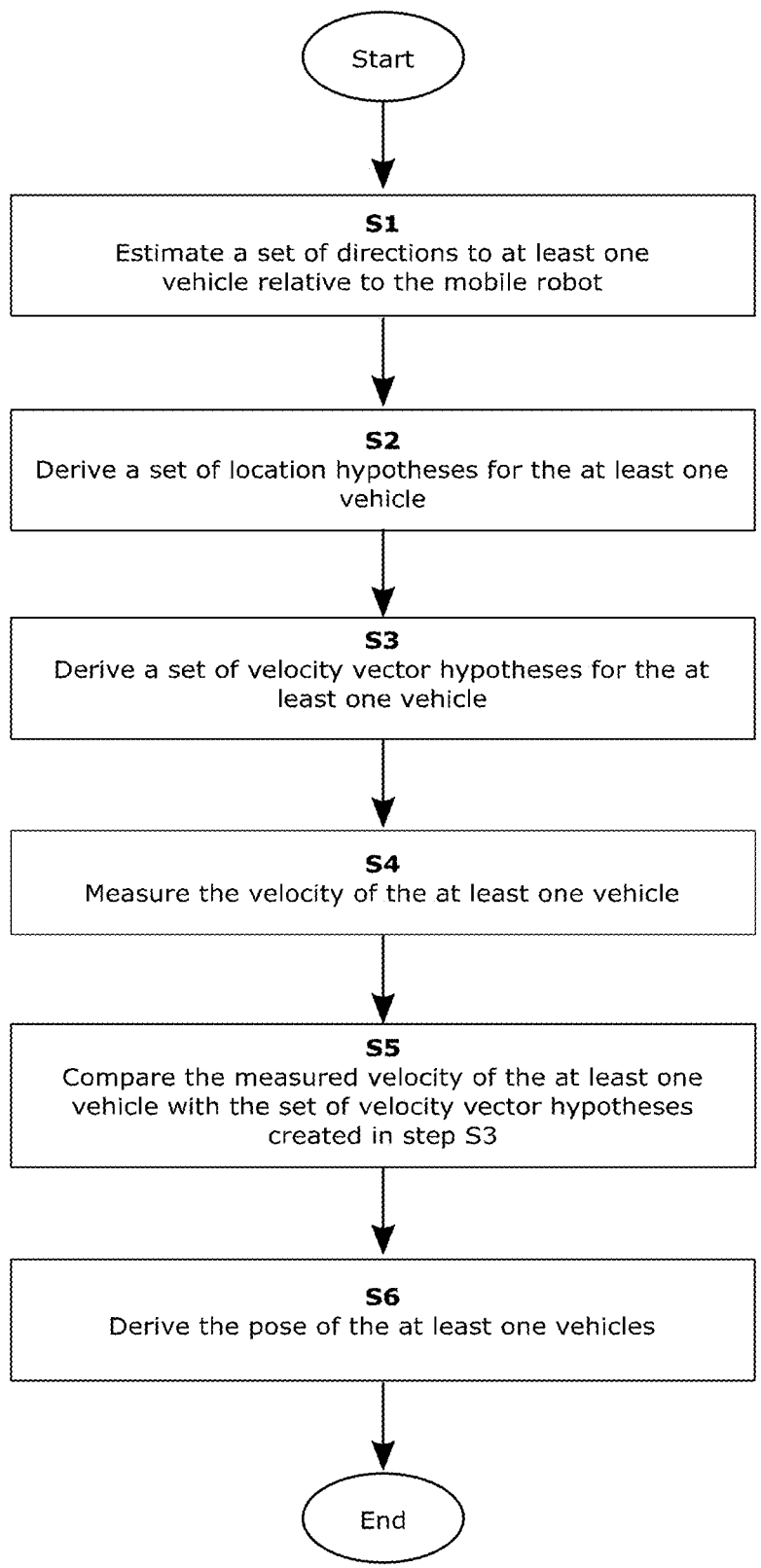
FIG. 4 shows a schematic description of an embodiment of vehicle detection and localization method.

FIG. 4 shows a schematic flow chart of an embodiment of a vehicle detection and localization method. First step S1 can comprise estimating a set of directions 310 (refer to FIG. 8A, FIG. 8B, FIG. 9), which may also be referred as a direction vector 310, to at least one vehicle 300, relative to the mobile robot 100. That is, the mobile robot can find the coordinates of a line that passes through the mobile robot 100 and the detected vehicle 300, preferably passes through the center of the mobile robot 100 and the center of the detected vehicle 300. Thus, a direction 310, in this context, can be defined as a line, preferably a straight line, that passes through the mobile robot 100 and the detected vehicle 300, preferably passes through the center of the mobile robot 100 and the center of the detected vehicle 300. A direction 310, according to this context, can comprise the coordinates of the line that passes through the mobile robot 100 and the detected vehicle 300. In an embodiment, the mobile robot 100 can be configured to find a direction 310 to a vehicle 300, relative to the current robot 100 pose. In such an embodiment, the mobile robot 100 can measure the position and direction of at least one of its cameras 110. The mobile robot 100 can also have prior knowledge of at least one of the position and direction of at least one of its cameras 110. This may avoid the need of the mobile robot 100 to measure at least one of the direction and position of at least one of its cameras 110. Further, the mobile robot 100 can calibrate the camera parameters so that it can be possible to transform pixel coordinates on an image 200 (i.e. pixel position of the vehicle 300 on the image 200) to a direction vector 310 relative to the mobile robot 100 current pose.

It should be noted the difference between the two terms "direction 310 to" and "direction of". The first term "direction 310 to" refers to the direction 310 (refer to FIG. 8A, FIG. 8B, FIG. 9) to a vehicle 300 relative to the mobile robot 100 as defined in the previous paragraph. The second term "direction of" refers to the normal English definition of the word direction, as in "direction of motion".

In a second step S2, the mobile robot 100 can be configured to derive a set of vehicle location hypotheses 231 (refer to FIG. 8A, FIG. 8B, FIG. 9) for the at least one vehicle 300. That is, the mobile robot 100 can be configured to derive at least one hypotheses about the real position (i.e. coordinates) of the vehicle 300. The mobile robot 100 can derive a plurality of location hypotheses 231 (i.e. coordinates) that express possible positions of the vehicle 300. The mobile robot 100 can derive a plurality of location hypotheses 231 (i.e. coordinates) where the vehicle 300 has a high probability (i.e. high chance) of being in that derived location hypotheses 231. Further, the mobile robot 100, based on certain features, such as but not limited to vehicle features 320, can assign a probability to each of the possible location hypotheses 231 estimated hypothetically, related to the chance of the vehicle 300 being in that location. In one embodiment, this can be achieved by having a direction 310 to the vehicle 300, that can be estimated according to step S1, and measuring the distance between the current mobile robot pose and vehicle 300. A direction 310 to the vehicle 300, relative to the current robot pose (i.e. a straight line that passes through the mobile robot 100 and vehicle 300) and a distance between the mobile robot 100 and the vehicle 300, can provide a location (i.e. coordinates) of the vehicle 300 (in a mathematical context a reference point, a distance and a direction relative to the reference point would correspond to one and only one point in space). In another embodiment, the robot 100 can comprise map data 161, that at least corresponds to the mobile robot's current and/or prospective operating area, such as the vicinity of the mobile robot 100. In another embodiment, the robot 100 can load such map data 161 from a storage device 160 located in the mobile robot 100 or in a remote server (refer to FIG. 10). In yet another embodiment, the robot 100 can be performing a Simultaneous Localization and Mapping (SLAM), wherein the mobile robot 100 can obtain the map data 161 itself simultaneously with its localization. Further, the mobile robot 100 can find the intersections of the direction 310 to the vehicle 300 (derived according to step S1) with the trajectories of the roads extracted from the map data 161. Based on these intersections the mobile robot 100 can create a set of location hypotheses 231 of the vehicle 300.

In a third step S3, the mobile robot 100 can derive a set of velocity vector hypotheses 240 for the at least one vehicle 300. The term "velocity vector", in this context, comprises a number and a vector, wherein the number expresses the speed (velocity amplitude, velocity number) of the vehicle 300 (i.e. amount of distance divided by time needed to accomplish such distance) and the vector expresses the direction of motion (i.e. the information vested in the relative position of a destination (or target) point with respect to a starting point). The mobile robot 100 can be configured to derive at least one hypotheses about the real velocity vector of the vehicle 300. The mobile robot 100 can derive a plurality of velocity vectors hypotheses 240 that are estimations of the real velocity vector of the vehicle 300. The mobile robot 100 can derive a plurality of velocity vector hypotheses 240 that the vehicle 300 has a high probability (i.e. high chance) of moving with such velocity vectors 240. Further, the mobile robot 100, based on certain features, such as but not limited to vehicle features 320, can assign a probability to each of the velocity vector hypotheses 240 estimated hypothetically, related to the chance of the vehicle 300 moving with such velocity vector. In an embodiment, the mobile robot 100 can derive such a set of velocity vector hypotheses 240 for the at least one vehicle 300 by measuring it with a velocity measuring device. In another embodiment, the mobile robot 100 can derive such velocity vector hypotheses 240, by finding a first and an $n^{th}$ location hypotheses 231 of the vehicle 300, wherein the first, the second to the $n^{th}$ location hypotheses 231 of the vehicle 300 correspond to different locations hypotheses 231 of the vehicle 300 on different time moments. That is, the first location hypotheses 231 can correspond to time T1, second location hypotheses 231 to time T2 and so $n^{th}$ location hypotheses 231 to time Tn. Between time T1, T2 . . . Tn a time delay is present. Thus, by having a first, second till an $n^{th}$ location hypotheses 231 and by knowing the time difference between location hypotheses 231, a velocity vector hypotheses 240 (refer to FIG. 9) can be derived, by the division of distance over time.

In steps S1, S2 and S3 ambiguities related to at least one of direction 310 of at least one vehicle 300, location hypotheses 231 and velocity vector hypotheses 240 of at least one vehicle 300 that can be detected by the mobile robot 100 can be created. In an example, the mobile robot 100 has estimated at least two location hypotheses 231 where it is probable for the vehicle 300 to be located at. For each of these location hypotheses 231, the mobile robot 100 has derived hypothetically a velocity vector hypotheses 240 (in step S3). Thus, ambiguities about the real location of the vehicle 300 may have been created. To solve such ambiguities, extra features can be taken into account. One such feature can be the real velocity vector of the vehicle 300.

Figure 10:
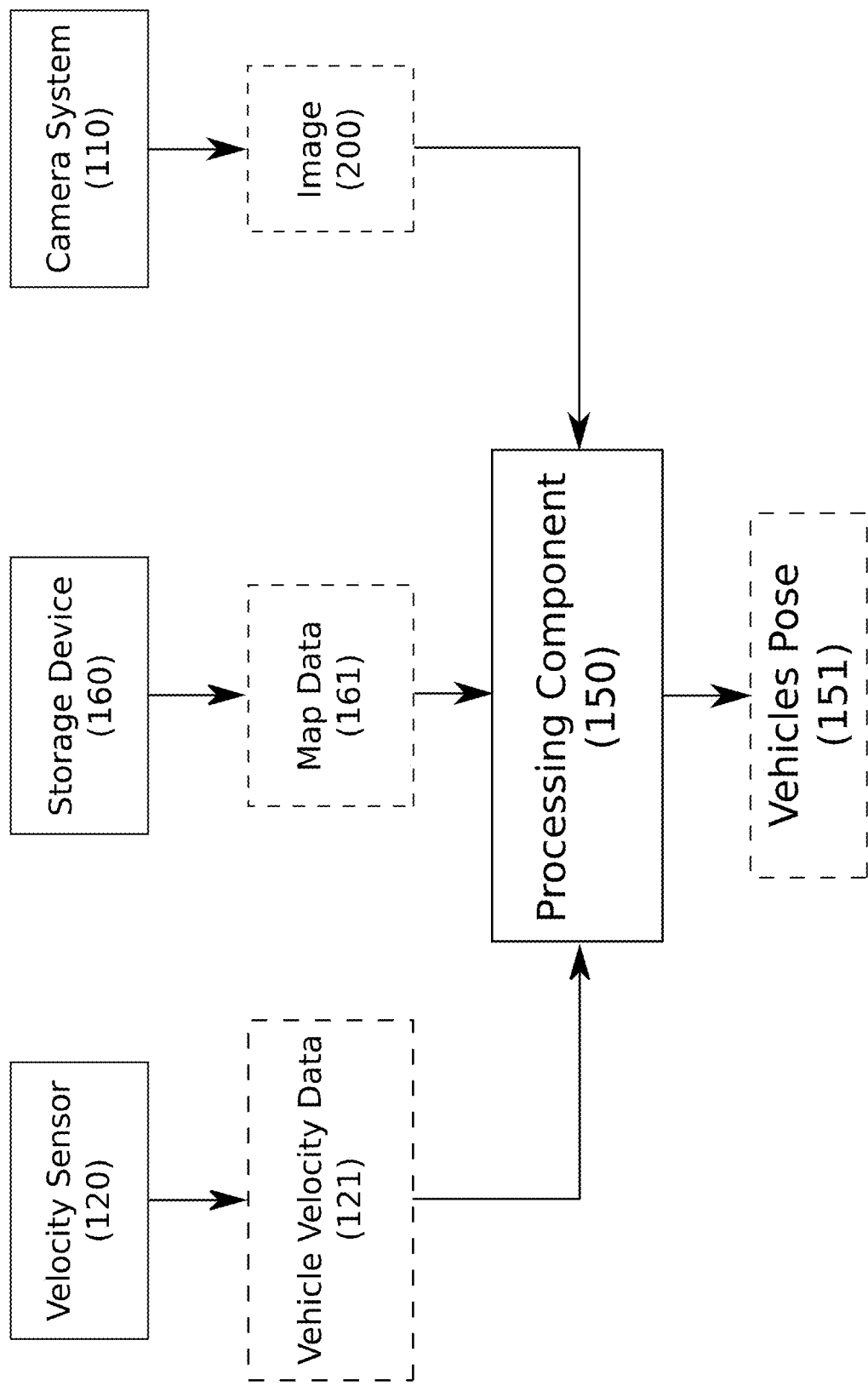
FIG. 10 shows a schematic overview of the sensor setup according to one embodiment of the invention.

In a fourth step S4 the real velocity of the vehicle 300 can be measured, using a velocity sensor 120 (refer to FIG. 10), producing vehicle velocity data 121, which can also be referred to as measured velocity 121 (refer to FIG. 10). That is, the mobile robot 100 can measure the velocity of the vehicle 300 using a specific velocity measure device, such as a Doppler radar. In an embodiment, the mobile robot can measure only the speed (a number in [distance unit]/[time unit]) of the vehicle 300. In another embodiment, the mobile robot 100 can measure the direction of movement of the vehicle 300. In yet another embodiment, the mobile robot 100 can measure the velocity vector of the vehicle 300 (i.e. both the speed and direction of motion). In yet another embodiment, the mobile robot 100 can measure the radial velocity, that is the speed that the vehicle 300 is approaching or moving away from the mobile robot 100 and/or if the vehicle 300 is approaching or moving away from the mobile robot 100.

It should be noted that there may be a difference between the velocity vector hypotheses 240, the measured velocity 121 and the real velocity of the vehicle 300. The real velocity of the vehicle 300 is the velocity that the vehicle 300 is actually driving with at the moment of interest. The measured velocity 121 is a set of vehicle velocity data 121 produced by a velocity sensor 120. The measured velocity 121 can be the summation of the real velocity with the error associated with measuring device, i.e. velocity sensor 120. The velocity vector hypotheses 240, is a set of hypotheses that the mobile robot 100 can derive, based on a certain logic, that provides a set of possible velocity vectors that the vehicle 300 can be driving with.

In a fifth step S5, the mobile robot 100 can compare the measured velocity 121 with the elements of the set of velocity vector hypotheses 240 created in step S3. The measured velocity 121 can correspond to the real velocity of the vehicle 300, or can be an approximate to the real velocity of the vehicle 300, or can be the real velocity of the vehicle 300 plus an offset that can correspond to the error of devices used for measuring the velocity of vehicle 300. Said real velocity of the vehicle 300 can be the velocity that the vehicle 300 was moving at the moment its velocity was measured by the mobile robot 100 (in step S4). Said comparison between the measured velocity 121 of the at least one vehicle 300 with the elements of the set of velocity vector hypotheses 240 created in step S3, can comprise finding a difference between the measured velocity vector 121 of the vehicle 300 and each of the elements of the set of velocity vectors hypotheses 240. Further the minimum difference can be found, that is the element on the set of velocity vector hypotheses 240, that is closest (i.e. has the minimum difference) with the measured velocity 121 of the vehicle 300 can be found.

In a sixth step S6, the mobile robot can derive a pose of the at least one vehicle. That is, the mobile robot 100 can find the location (i.e. coordinates) of the vehicle 300. The mobile robot 100, can further find the orientation of such a vehicle 300. In one embodiment, the mobile robot 100 can find the location of at least one vehicle 300 by using the element of the set of the vehicle vector hypotheses that comprises the minimum difference to the measured velocity, found in step S5. More particularly, the set of location hypotheses 231 that were used to calculate the velocity vector hypotheses 240 from the set of velocity vector hypotheses 240 can be the real location of the vehicle 300. That is, such a position has the highest probability of the vehicle 300 being in that position. Further, the mobile robot 100 can derive multiple positions and can assign to each of them a probability based on the chance that the vehicle 300 can be in that respective position. In an embodiment, the mobile robot 100 can use extra features to find the orientation of the vehicle 300. Thus, finding the position and the orientation of the vehicle 300, the mobile robot 100 can derive the pose of the vehicle 300.

Figure 5:
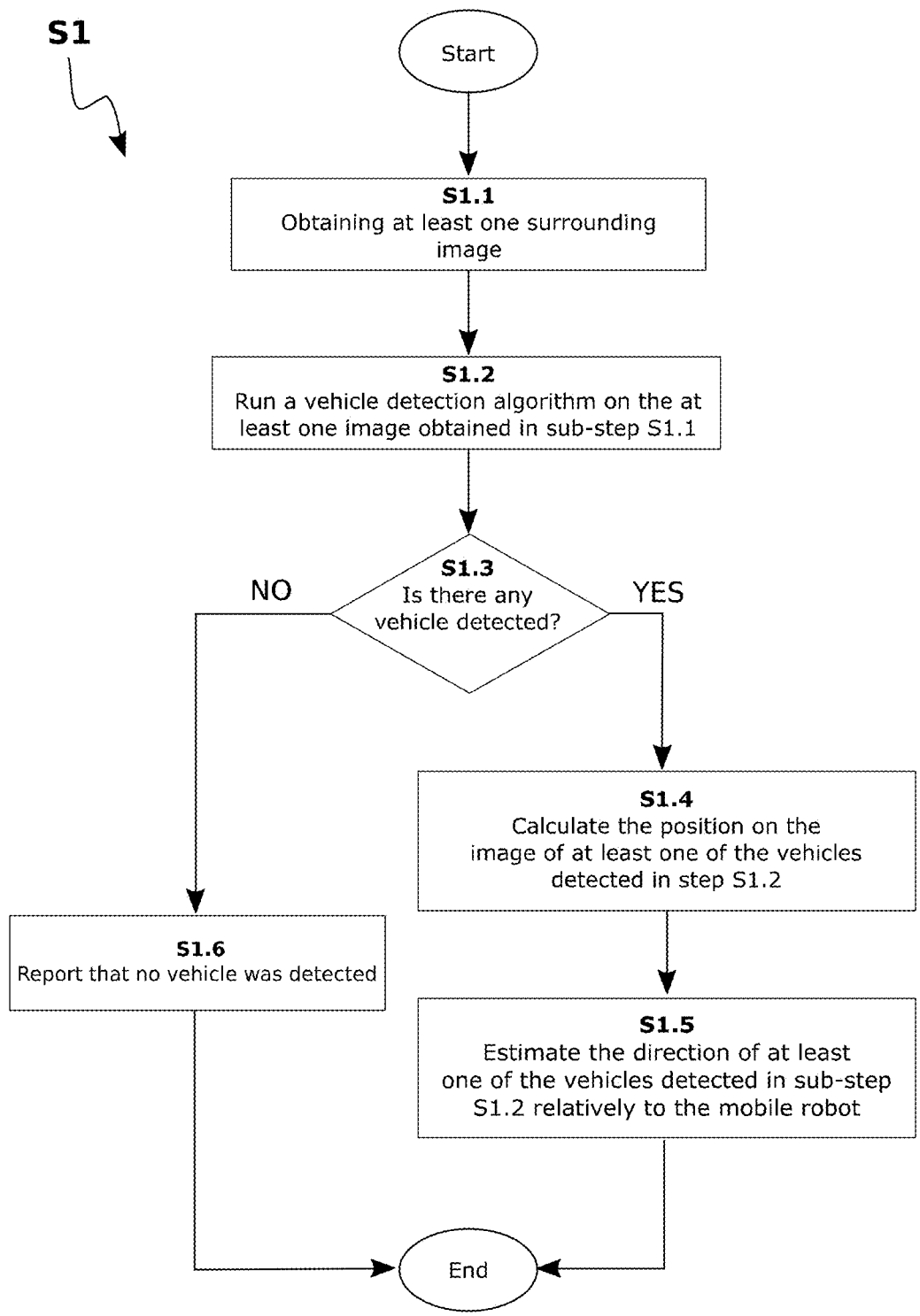
FIG. 5 shows a schematic detailed description of step S1 on FIG. 4 related to how the set of directions to at least one vehicle relative to the mobile robot is estimated.

FIG. 5 shows a schematic description of the realization of step S1 on FIG. 4 according to one embodiment. FIG. 5 describes in a more detailed manner how the mobile robot can estimate a set of directions 310 to at least one vehicle 300. That is, in FIG. 5 an embodiment of detecting a vehicle 300 and further finding a direction 310 to the detected vehicle 300 is depicted.

In a first sub-step S1.1 of step S1, the mobile robot 100 can obtain at least one surrounding image 200. The mobile robot 100, can capture at least one image 200 using at least one of its cameras 110. In an embodiment, the mobile robot 100 can capture at least one image 200 that can correspond to at least one of the front, side or back views of the mobile robot 100. In an embodiment, the mobile robot 100 can measure at least one of position and direction of at least one of the cameras 110. The mobile robot 100 can also calibrate camera parameters. Thus, in an embodiment, the mobile robot 100 can adjust at least one of the cameras 110 so that it can transform the pixel positions on the captured images 200 on direction vectors 310 to the at least one detected vehicle 300 relative to the current mobile robot's 100 pose. In another embodiment, the mobile robot 100 can have its cameras 110 adjusted in advance so that it does not have to apply such adjustments just before, while or after obtaining the image 200. In another embodiment, the mobile robot 100 can adjust the cameras 110 on at least one of the following time moments: before, during and/or after capturing an image 200.

In a second sub-step S1.2 of step S1, the mobile robot 100 can run a vehicle detection algorithm on the at least one image obtained in sub-step S1.1. That is, the mobile robot 100 can process the images 200 as described in FIG. 2 (refer to FIG. 2 with its corresponding description). The mobile robot 100 can process one of the images 200 obtained in sub-step S1.1. The mobile robot 100 can also process a plurality of the images 200 obtained in sub-step S1.1. In another embodiment, the mobile robot 100 can process only a part (i.e. fraction) of the images 200 obtained in sub-step S1.1. In yet another embodiment, the mobile robot 100 can preprocess at least one image 200 for finding regions of the image 200 that have the highest chances of comprising a vehicle 300, and can further process such regions of the images 200 for detecting the vehicle 300. This can be done, for example, for reducing processing time.

In a further sub-step S1.3 of step S1, the mobile robot 100, based on the results of the preceding sub-step S1.2, can make a decision if there was a vehicle detected or not. That is, in sub-step S1.2 the mobile robot 100 can process the images 200, for example can apply a vehicle detection algorithm on the images. If the image processing results in a vehicle 300 detected on the image 200, for example the image processing algorithm outputs the vehicle detection indicator 210 and/or the vehicle feature indicator 220, then the mobile robot 100 can make the decision that a vehicle 300 was detected on image 200 and can proceed in sub-step S1.4. In sub-step S1.4 the mobile robot 100, based on the results of the image processing executed in sub-step S1.2, can calculate the position of the detected vehicle 300 on the image 200. That is, the mobile robot 100, can calculate on which part of the image 200 the vehicle 300 is positioned and can represents such a position with coordinates with reference to a coordinate system created to represent positions of the image 200. Such a coordinate system can for example be a cartesian coordinate system with its origin on the center of the image 200. The mobile robot 100, can calculate which of the pixels of the image 200 represent the detected vehicle 300.

Sub-step S1.4 is followed by sub-step S1.5 of step S1. In sub-step S1.5 the mobile robot 100 can estimate the direction 310 to at least one the vehicles detected in sub-step S1.2, relatively to the mobile robot 100. In an embodiment, the mobile robot 100 can transform the pixel position on the image 200 of the detected vehicle 300 to a direction vector 310 that can point to the detected vehicle 300 with a starting point the current pose of the mobile robot 100 (or vice versa the direction vector 310 can start at the vehicle 300 and point to the mobile robot 100). In another embodiment, the mobile robot 100 can estimate a direction 310 to the vehicle 300, by finding a line, preferably a straight line, that passes through the mobile robot 100 and the vehicle 300.

In an embodiment, the mobile robot 100 can detect only one vehicle 300 in step S1.2. In another embodiment, the mobile robot 100 can detect a plurality of vehicles 300. In another embodiment, the mobile robot 100 can detect all the vehicle 300 positioned in the field of view of cameras 110. In an embodiment, sub-steps S1.4 and S1.5 can be repeated for any of the vehicles 300 detected on the image 200 in sub-step S1.2. In an embodiment, sub-steps S1.4 and S1.5 can be executed for only one of the vehicles 300 detected in sub-step S1.2. In another embodiment, sub-steps S1.4 and S1.5 can be executed for a plurality of detected vehicles 300. In another embodiment, sub-steps S1.4 and S1.5 can be executed for the vehicle 300 that have the highest chance of intersecting the trajectory of motion of mobile robot 100.

Referring back to sub-step S1.3 of step S1, in case the image processing algorithm of sub-step S1.2, outputs that no vehicle was detected in the image 200, then sub-step S1.3 is followed by sub-step S1.6. That is, the mobile robot 100 can report that no vehicle 300 was detected. In such a case the mobile robot 100 skips step S1.4 and step S1.5.

Figure 6:
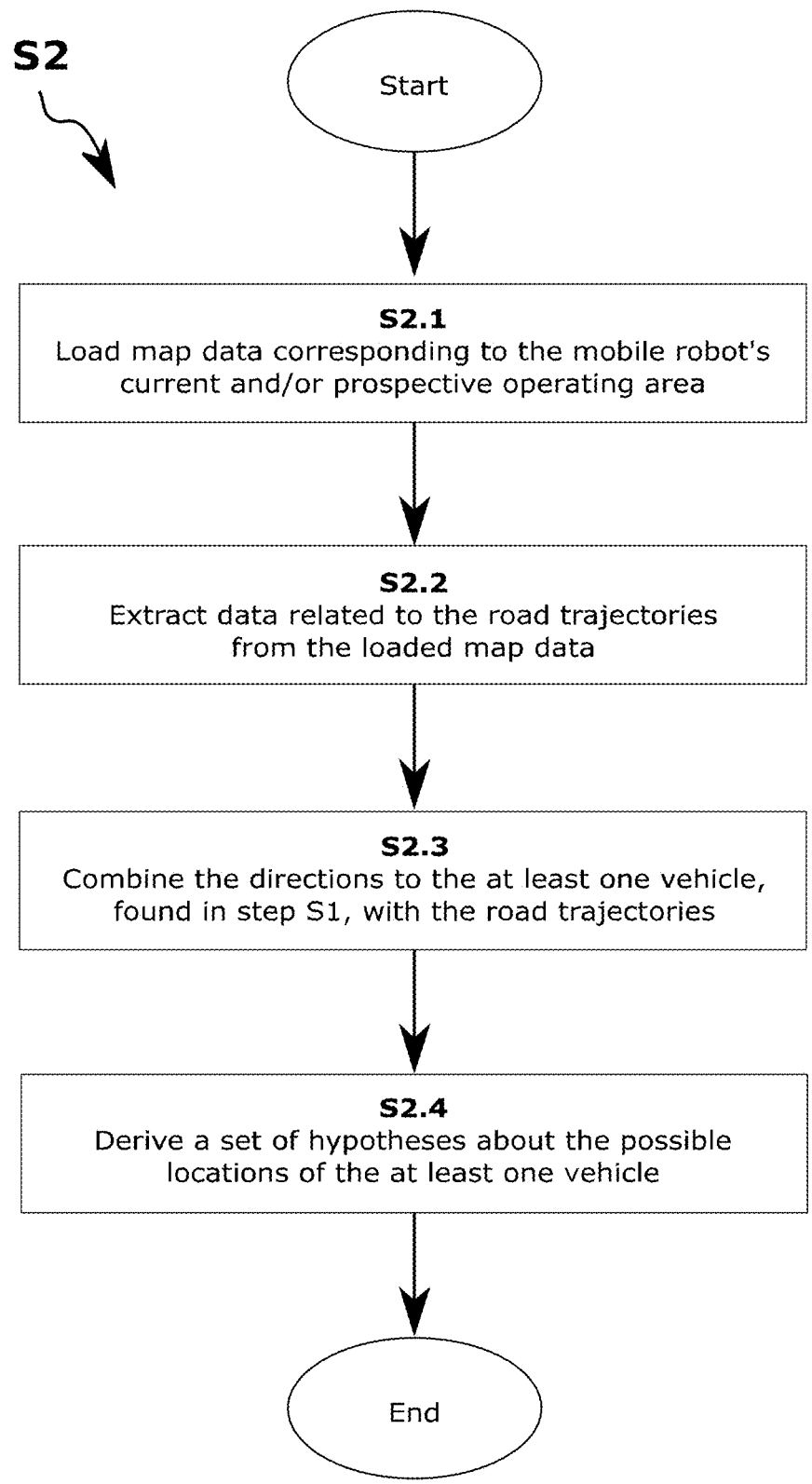
FIG. 6 shows a schematic description of step S2 on FIG. 4 related to how the set of location hypotheses for the at least one vehicle is derived.

FIG. 6 shows a detailed flow chart of one embodiment of step S2 in FIG. 4. In FIG. 6 the procedure of deriving a set of location hypotheses 231 about possible positions of the vehicles 300 is depicted in more detail. That is, FIG. 6 depicts the procedure wherein the mobile robot 100 derives a set of coordinates about possible positions in the real world of the vehicle 300.

In the embodiment depicted in FIG. 6, in a first sub-step S2.1 of step S2, the mobile robot 100 can load map data 161 corresponding to the mobile robot's current and/or prospective pose. In another embodiment, the robot 100 can comprise map data 161 that at least correspond to the mobile robot's current and/or prospective operating area, such as the vicinity of the mobile robot 100. In another embodiment, the robot 100 can load such map data 161 from a storage device 160 located in the mobile robot 100 and/or in a remote server. In yet another embodiment, the robot 100 can be performing a Simultaneous Localization and Mapping (SLAM), wherein the mobile robot 100 can obtain the map data 161 itself simultaneously with its localization. Said map data 161 can comprise at least information about the position and the trajectories of the roads 230 of the current and/or prospective operating area of the mobile robot 100. In another embodiment, said map data 161 can comprise information about the position and trajectory of at least the roads 230 that intersect the trajectory of movement of the mobile robot 100.

In sub-step S2.2 of step S2, the mobile robot can extract the data related to the road 230 trajectories and positions form the loaded map data 161. That is, the mobile robot 100 can extract a set of data that indicate to the robot 100 the positions and trajectories of the roads 230 that are positioned in the current and/or prospective operating area of the mobile robot 100. The mobile robot 100, in an embodiment, can comprise the coordinates of a plurality of points that can represent the trajectory and the position of the roads 230 in the vicinity of the mobile robot 100 (i.e. in the current and/or prospective operating of the mobile robot 100; roads 230 positioned in the loaded map data 161; roads 230 that can be in the field of view of cameras 110).

In a third sub-step S2.3 of step S2, the mobile robot 100 can combine the data that indicate the roads 230 trajectories and positions with the directions 310 to the at least one vehicle 300 estimated in step S1. In an embodiment, the mobile robot 100 can find the intersections of the road 230 trajectories with the directions 310 to the vehicles 300 found in step S1. Based on traffic rules a vehicle 300 has a very high probability of being in a road 230 for vehicles (i.e. a vehicle under normal conditions cannot be outside the region of a road 230, for example, cannot be moving in a pedestrian road, such as sidewalks). Thus, in sub-step S2.4, the mobile robot 100 creates a set of hypotheses implying that the vehicle 300 can be positioned in the intersections created by the direction 310 to that vehicle 300 and the vehicle road 230 trajectories. The mobile robot 100, can find a set of coordinates, that correspond to the said intersections, that can represent possible locations of the vehicle 300. It is logical that the vehicle 300 can be positioned only on one of such positions (i.e. intersection). That is why the mobile robot 100 considers the intersections created by the direction 310 to that vehicle 300 and the vehicle road 230 trajectories, as hypotheses. In an embodiment, the mobile robot 100, based on extra features can assign a corresponding probability to each of the location hypotheses 231 derived hypothetically in sub-step S2.4, that relates to the chances of the vehicle 300 being on the respective location hypotheses 231.

In FIG. 7A and FIG. 7B a top view of a scenario comprising a vehicle 300 driving on the road 230 and a mobile robot 100 is depicted. For simplicity reasons the scenario of FIG. 7A and FIG. 7B comprises only two roads 230. One road, that is also referred to as the "vertical" road for reasons of simplicity (i.e. the road where the vehicle is shown driving on FIG. 7A) is referred here with the numeral 230V and a second road, referred to as the "horizontal" rode (i.e. the road 230 where the vehicle 300 is not shown driving in FIG. 7A) is referred with the numeral 230H. This is done only for clarity purposes. In another scenario, the roads 230 may have different trajectories (i.e. shapes), for example, roads 230 may not be straight roads, roads 230 may comprise curves, roads 230 may not be perpendicular, roads 230 may not intersect etc. In another scenario, only one road 230 may be present in the vicinity of the mobile robot 100. In another scenario, a plurality of roads 230 may be present in the vicinity (i.e. current and/or prospective operating area) of the mobile robot 100. In a scenario, a plurality of vehicles 300 may be present in the at least one road 230. Vehicles 300 may be driving on the roads 230, may be stationary on the roads 230, may be parked on the roads 230 etc.

In FIG. 7A the vehicle 300 is shown in a first position and in FIG. 7B the vehicle 300 is shown in a second position. Between the two scenarios depicted in FIG. 7A and FIG. 7B a time delay can be present. That is, FIG. 7B can represent a scenario that happened after some amount of time from the scenario depicted in FIG. 7A. For example, FIG. 7A can depict the scenario as it was when the mobile robot 100 captured a first set of images 200 and FIG. 7B can depict the scenario as it was when the mobile robot 100 captured a second set of images 200. Only a first and second position of the vehicle 300 (i.e. a first and a second time stamp of the scenario) are considered here, for clarity and brevity of illustration. In an embodiment, at least one position of the vehicle 300, preferably a plurality of positions of vehicle 300, can be considered. That is, in an embodiment, the mobile robot 100 can obtain only a first set of images 200. In another embodiment, the mobile robot can obtain a first and a second set of images 200, wherein there is a time delay between first set and the second set. In yet another embodiment, the mobile robot 100 can obtain a plurality of sets of images 200, with a time delay present between the sets.

Figure 8A:
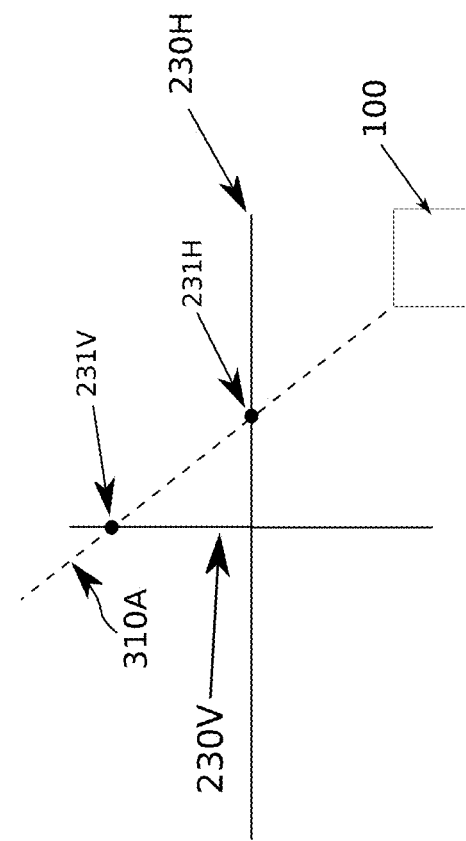
FIG. 8A shows a schematic drawing of the scenario in FIG. 7A.

In FIG. 8A, a schematic drawing of the scenarios illustrated in FIG. 7A is shown. The dotted line 310A depicts a first direction 310A to the vehicle 300 relatively to the mobile robot 100 according to an embodiment. Such a direction 310 can be obtained by the mobile robot 100 according to the procedure described in FIG. 5. It will be understood that when two objects (such as vehicles 300) are positioned in the same direction with respect to the robot's camera, such objects will overlap each other on an image generated by the camera. That is, from the position of an object on an image, one may derive its direction with respect to the camera capturing the image to thereby arrive at dotted line 310A. Further the mobile robot 100 has created a first set of location hypotheses 231V, 231H about possible locations of the vehicle 300. Such location hypotheses 231V, 231H can be derived by the mobile robot 100 according to the procedure described in FIG. 6. That is, the mobile robot 100 can extract from the map data 161 the positions and trajectories of the roads 230 (230V and 230H). Further by finding the intersection between the direction 310A with the roads 230V the mobile robot 100 derives the location hypotheses 231V of the vehicle 300. By finding the intersection between the direction 310A and the road 230H the robot 100 derives another location hypotheses 231H. The robot can check that there are no more roads 230 in its current and/or prospective area of operating and thus can conclude with a first set of location hypotheses comprising the location hypotheses 231V and 231H.

Figure 8B:
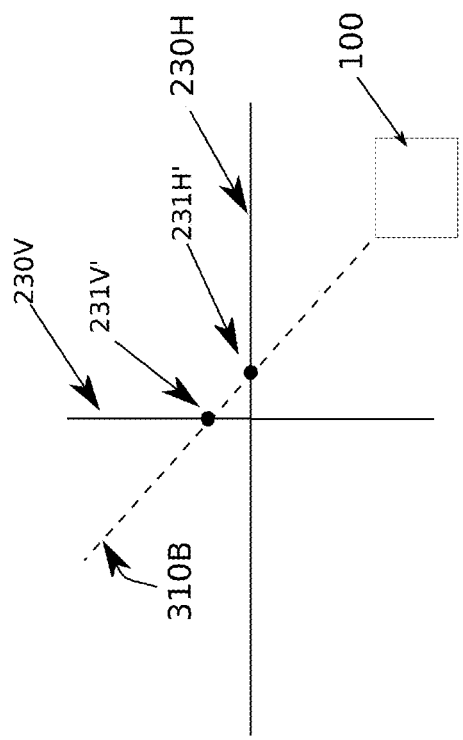
FIG. 8B shows a schematic drawing of the scenario in FIG. 7B.

In FIG. 8B a schematic drawing of the scenarios illustrated in FIG. 7B is shown. In a similar manner to the one described in FIG. 8A the mobile robot creates the second set of location hypotheses comprising the location hypotheses 231V' and 231H'.

Analyzing the first set of location hypotheses (231V and 231H) and the second set of location hypotheses (231V' and 231H'), the mobile robot can arrive on the conclusion that the vehicle 300 can either be moving on the road 230V from 231V to 231V' (in case the scenario of FIG. 7A happened before in time than the scenario in FIG. 7B) or the vehicle 300 can be moving in the road 230H from 231H to 231H'. It should be noted that the mobile robot 100 does not consider other combination between the first and the second possible location hypotheses, as it violates the rules of traffic (the car cannot drive outside of the roads 230) and the time delay between the two scenarios can be short enough for the car 300 to have driven on the road 230 between such locations.

Figure 9:
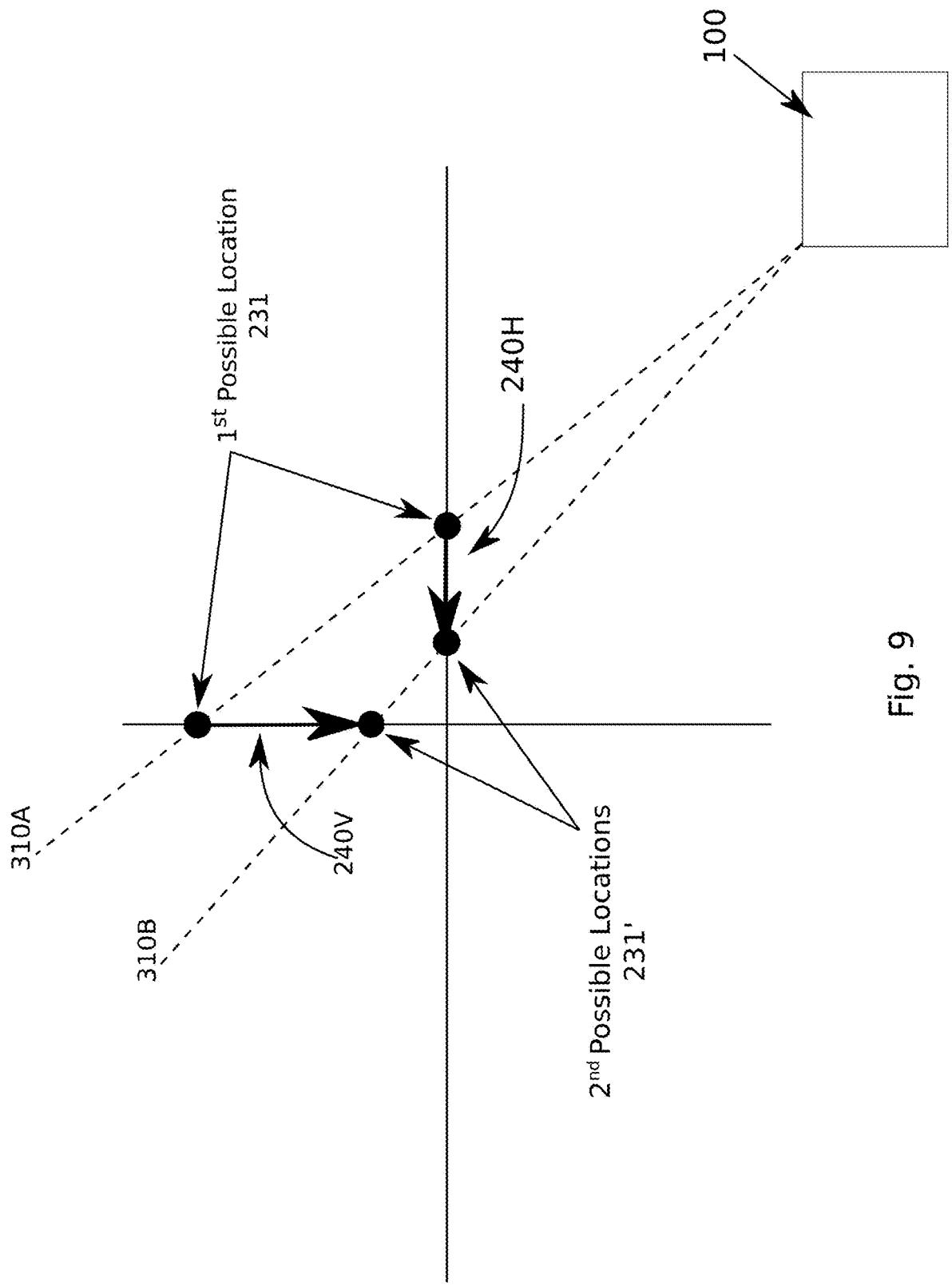
FIG. 9 shows a combination of FIG. 7A and FIG. 7B.

Referring now to FIG. 9, it is shown that the mobile robot 100 has created a set of velocity vector hypotheses 240 based on the location hypotheses 231 and 231'. That is, according to this scenario, the mobile robot 100 has created the hypotheses that the vehicle 300 can either be moving with the velocity vector hypotheses 240V or with the velocity vector hypotheses 240H. Further the mobile robot 100 can calculate the amplitude of the velocity vector hypotheses 240 by dividing the distance between the first location hypotheses 231 and the second location hypotheses 231' (such distance can be calculated from map data 161) and the time between the first and the second scenario depicted on FIG. 7A and FIG. 7B (further depicted in the schemes of FIG. 8A and FIG. 8).

That is, the method described hitherto provides two alternative hypotheses 240V, 240H for the velocity vector of the car, and hence two sets of hypotheses where the vehicle 300 was located when the images corresponding to the situations in FIGS. 7A and 7B were taken. Embodiments of the present invention also try to resolve this ambiguity. This may be achieved by different means. A first possibility may be to compare the amplitudes of the first and second velocity vector hypotheses 240V, 240H for plausibility. As a mere example, the velocity vector hypothesis 240H may have an amplitude of 43 km/h, and the second velocity vector hypothesis 240V may have an amplitude of 156 km/h. If the robot is currently travelling in a city with a speed limit of 50 km/h, the first velocity vector hypothesis 240H may the more plausibly one in this scenario. It should be understood that this is a mere example, and the method may also use other information (e.g., average speed of vehicles in a certain environment or on a certain road) to determine one of the hypotheses as the more plausible one.

Other methods to resolve the ambiguity additionally or alternatively take information relating to a size of a detected vehicle 300 into account. It will be understood that vehicles 300 having a larger representation on the image are typically closer to the camera than vehicles having a smaller representation on the image. That is, by using the size of a vehicle (e.g., a car) in an image, one may also compute a distance of this vehicle to the camera, in particular when having calibrated camera parameters, such as focal length and pixel size. For example, one may assume that the average height of a car is approximately 1.5 m and thus provide an estimate of a distance of a car that has been detected on an image. This rationale may be used to determine which of the hypotheses is more plausible.

Additionally or alternatively, embodiments of the described method may also determine an orientation of a vehicle with respect to the camera, and take this orientation into account. Detection of vehicle orientations from images can be done in several ways. For example, object detectors may be used, such as template matching, deformable parts models, and/or neural networks. Such an object detector may be tuned to detect vehicles at a certain angle. In case of using object detectors based on machine learning, each of several detectors would be trained only on images of cars of a certain orientation. That is, the present method would not only employ a general vehicle detector able to determine the presence of a vehicle on an image, but additional vehicle orientation detectors (such as a straight vehicle detector for vehicles approaching the camera in a straight manner, a 90° vehicle detector for vehicles positioned at 90° with respect to a camera axis, etc.). That is, embodiments of the present technology also determine and use vehicle orientation, e.g., in addition to position and size. Thus, it may be possible to determine whether a vehicle is moving towards the camera, away from it or with a certain angle with respect to the camera. This may be used in different ways: The method may ignore vehicles moving away from the camera, as such vehicles are not dangerous for the robot. Additionally or alternatively, one may compare the detected orientations with directions of the road to again check which hypothesis is more plausible than the others.

In some embodiments, an image classifier algorithm may be used to classify detected vehicles as having a certain orientation, one example reference for such an image classification being Krizhevsky et al.; ImageNet Classification with Deep Convolutional Neural Networks; Advances in Neural Information Processing Systems 25; 2012; 1097.

Also, the detected car orientation can be added as one of outputs for neural network object detector (similar to car width and height).

However, the ambiguities relating to the velocity vector hypotheses 240H, 240V may also be solved in different manners. For example, the mobile robot 100 may conduct further measurements. In an embodiment, the mobile robot 100 can use a Doppler radar to measure the velocity vector (or at least a component thereof) of the vehicle 300. It can compare the measured velocity with the hypothetical velocity vectors and can solve the ambiguities (i.e. decide in which of the locations the mobile robot is positioned).

Referring to FIG. 10 a schematic overview of the sensory setup according to one embodiment of the invention is shown. That is, FIG. 10 depicts how the sensors and the data obtained from the sensors are combined. For a better understanding, in FIG. 10, the hardware part of the device is shown in rectangular boxes and the data produced by the hardware part is shown in rectangular boxes with dashed lines.

As shown in FIG. 1, which shows an embodiment of a mobile robot 100 according to the invention, the mobile robot 100 comprises at least one camera 110, which may also be referred as a camera system 110. The camera system 110 may comprise any of the cameras discussed above with their respective viewing angels. In a preferred embodiment, the mobile robot 100 can comprise cameras 20 and 30 which can be stereo cameras, and the side cameras 40 and 50 which can also be stereo cameras. In such embodiments, the mobile robot 100 comprises a field of view on the front and both sides of mobile robot 100.

Cameras 110 are used by the mobile robot 100 to capture at least one image 200 of the surroundings of the mobile robot 100. It is advantageous for the mobile robot 100 to know the direction that images 200 are taken. To illustrate this concept better the following specific example is provided. In this example, the mobile robot 100 uses the cardinal directions (north, south, east, west) as reference system for its orientation. At time T the mobile robot 100 captures a set of images 200 using at least one of its cameras 110. Using data related to the mobile robot's 100 pose and by measuring (or knowing in advance) the direction of the cameras 110 used to capture the images 200 the mobile robot 100 can calculate the direction on which the images 200 are taken. For example, the mobile robot 100 is oriented in the direction 20° clockwise relative to the north direction, and the camera 110 that captured the image 200 is oriented 10° in the clockwise direction relative to mobile robot 100. Then, by simple calculation the mobile robot 100 can conclude that the image 200 taken by the camera 110 relates to the direction 30° clockwise relative to the north direction. This info can be valuable in later stages when determining a direction 310 to a detected vehicle 300 and further when estimating a vehicle pose 151. Further having a coherent coordinate system which also does not change orientation if the mobile robot 100 changes its orientation (in the illustrative example the cardinal directions were taken as reference) is advantageous as the data related to image 200 direction stay constant even if the mobile robot 100 would change its direction. Otherwise the data related to the image 200 direction need to be updated for each change the mobile robot 100 does to its orientation.

Further the mobile robot 100 can comprise a velocity sensor 120 that can be configured to measure the velocity of target such as a vehicle 300, producing vehicle velocity data 121. In an embodiment, the velocity sensor 120 can measure only the speed (a number in [distance unit]/[time unit]) of the vehicle 300, or one component of the speed, such as the component of the speed towards the robot 100. In another embodiment, the velocity sensor 120 can measure the direction of movement of the vehicle 300. In yet another embodiment, the velocity sensor 120 can measure the velocity vector of the vehicle 300 (i.e. both the speed and direction of motion). In yet another embodiment, the velocity sensor 120 can measure the radial velocity, that is the speed that the vehicle 300 is approaching or moving away from the mobile robot 100 and/or if the vehicle 300 is approaching or moving away from the mobile robot 100. Such information related to the vehicle 300 velocity, measured by the velocity sensor 120, is comprised in the vehicle velocity data 121, which can also be referred to as the measured velocity 121.

The velocity sensor 120 can be configured as an electromagnetic wave transmitter and receiver (i.e. radar). That is the velocity sensor 120 transmits electromagnetic wave in a certain direction. If such electromagnetic wave hit a target such as a vehicle 300 they are reflected and can be received by the velocity sensor 120. By analyzing the difference between the received electromagnetic wave and the transmitted one, such as the difference in the frequencies of the electromagnetic waves, data related to the velocity of the hit targets can be produced. A specific example of such a velocity sensor is a Doppler radar.

Further the mobile robot 100 can comprise a storage device 160. Such a storage device can comprise a primary memory, such as a RAM, and/or a secondary storage, such as HDD and/or SDD. The storage device 160 can also be a storage located outside the mobile robot 100 in a distant location, such as a server. In such embodiments, the mobile robot 100 comprise a communication component to the server for uploading data to and downloading data from the server. The storage device 160 can comprise map data 161 corresponding to at least the mobile robot's current and/or prospective pose. Said map data 161 can comprise at least information about the position and the trajectories of the roads 230 of the current and/or prospective operating area of the mobile robot 100. In another embodiment, said map data 161 can comprise information about the position and trajectory of at least the roads 230 that intersect the trajectory of movement of the mobile robot 100. In yet another embodiment, the robot 100 can be performing a Simultaneous Localization and Mapping (SLAM), wherein the mobile robot 100 can obtain the map data 161 itself simultaneously with its localization.

Further, the mobile robot 100 comprises a processing component 150. The processing component 150 take as input data the vehicle velocity data 121, the map data 161 and the image 200 and by processing and combining such data according to the algorithms and methods described in this document, the processing component 150 outputs at least one vehicle pose 151, preferably the poses of all the vehicles in the current and/or prospective area of the mobile robot 100.

In an embodiment, the mobile robot 100 can use only the data provided by the camera system 110 to detect and estimate a vehicle pose 151. In such embodiments, it can be advantageous to use more advanced camera system 110, such as cameras 110 with high resolution. It can also be advantageous that in such embodiments the camera system 110 can comprise stereo cameras 110 that can be used to estimate a distance to a target, such as a vehicle 300. Such a mobile robot 100 can for example be used in rural areas when the complexity of scenarios the mobile robot 100 can encounter is lower, that is the number of vehicles 300 and vehicle roads 230 is smaller. In such embodiments only data from camera system 110 is required, but more advanced cameras 110 can be required and the estimation of vehicle pose 151 can be more prone to errors.

In another embodiment, the mobile robot 100 comprises a camera system 110 and at least one velocity sensor 120. The mobile robot 100 can combine data received from both the sensors, the velocity sensor 120 and the camera system 110, to estimate a vehicle pose 151. In such embodiments, the mobile robot 100 can obtain a plurality of images 200 using the camera system 110 and can derive a direction 310 to the vehicle 300 (refer to FIG. 3). Using the velocity sensor 120, the velocity of the vehicle 300 can be measured. Combining such data, the processing component can calculate at least one vehicle pose 151. In such embodiments, it can also be desirable to calculate or measure the distance to the vehicle 300. This can be done by either measuring the distance to the vehicle using the velocity sensor 120 (i.e. radar) or by calculating it using stereo cameras 110 or both. The distance to the vehicle 300 can solve ambiguities created by the use of the measured velocity 121 and images 200. The distance to the vehicle 300 can also decrease the estimation error of the vehicle pose 151.

In another embodiment, the mobile robot 100 can comprise at least one velocity sensor 120, a storage device 160 and a camera system 110. In such embodiments, the processing component 150 can take as input the vehicle velocity data 121, the map data 161 and the image 200, and can estimate a vehicle pose 151. The processing component 150 can for example apply the algorithms previously described in this document. In such embodiments, the accuracy of vehicle pose 151 estimation is higher. Further the need of measuring or calculating the distance to the vehicle 300 is avoided by the use of map data.

The vehicle pose 151 can comprise a location of a localization target, such as a vehicle 300. Such a location can be expressed in coordinates with reference to a 2D-coordinate system or 3-D coordinate system. In a preferred embodiment, the vehicle pose 151 comprises 3-D coordinates. The vehicle pose 151 can further comprise also the orientation of the vehicle 300. Data about the orientation of the vehicle 300 can be advantageous for predicting the direction of movement of the vehicle 300. Further the vehicle pose 151 can comprise data related to the vehicle features 320.

It should be noted that through the description it is assumed that the mobile robot 100 comprises data about its own pose. Such an assumption is valid under the fact that the mobile robot 100 can be an autonomous or partially autonomous driving mobile robot 100.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

We claim:

1. A method for determining a location of an object, the method comprising:
    processing image data to determine a direction between a camera capturing images and the object, wherein the images correspond to the image data;
    processing additional data comprising at least one of map data and velocity sensor data; and
    combining information based on the image data and the additional data to determine a location of the object,
    wherein the object is a moving vehicle, wherein the additional data comprises map data comprising data related to roads, wherein the step of combining the information to determine the location of the object comprises: determining at least one intersection between at least one road and a line corresponding to a direction between the camera and the object to arrive at a possible location of the object;
    wherein, in the step of determining at least one intersection, a plurality of intersections between the at least one road and lines are determined, wherein the at least one road is a plurality of roads, wherein the lines correspond to directions between the camera and the object for images captured at different points of time, to arrive at possible locations of the object for different points of time; and
    wherein the step of combining the information to determine the location of the object comprises: selecting a location of the possible locations as the location of the object, wherein this selection step comprises generating speed hypotheses for the object based on the possible locations at different points of time and selecting the location based on the most likely speed hypothesis for the object.

2. The method according to claim 1, wherein the additional data comprises velocity sensor data.

3. The method according to claim 2, wherein the image data comprises a plurality of images captured at different points of time; and
    wherein in the step of processing image data, a plurality of lines corresponding to directions between the camera and the object at different points of time are determined; and
    wherein in the step of combining information to determine a location of the object, at least one spatial vector is fitted in between the lines, which spatial vector depends on the velocity sensor data and a time difference between the different points of time.

4. The method according to claim 2, wherein the velocity sensor data is based on a measurement by a Doppler radar sensor.

5. The method according to claim 4, wherein the image data comprises images captured at least three different points of time; and
    wherein in the step of processing image data, at least three lines corresponding to directions between the camera and the object at at least three different points of time are determined; and
    wherein the step of combining information to determine a location of the object comprises:
    fitting spatial vector hypotheses in between the lines, the spatial vector hypotheses having a vector component depending on the velocity sensor data and a time difference between the different points of time, and identifying a most likely spatial vector hypothesis; and
    wherein the most likely spatial vector hypothesis corresponds to a spatial vector hypothesis having an identical spatial vector hypothesis connecting a first point on a first line to a second point on a second line, and the second point on the second line to a third point on a third line.

6. The method according to claim 1, wherein the method further comprises processing data relating to an orientation of the object.

7. The method according to claim 1, wherein the method further comprises determining a distance of the object based on a size of the object in the image data.

8. The method according to claim 1 and further comprising the step of a camera capturing the images corresponding to the image data, wherein the camera is comprised by a robot, wherein the robot is configured not to travel with a speed exceeding 10 km/h, wherein the robot weights less than 50 kg.

9. A method for determining a location of an object, the method comprising:
    processing image data to determine a direction between a camera capturing images and the object, wherein the images correspond to the image data;
    processing additional data comprising at least one of map data and velocity sensor data; and
    combining information based on the image data and the additional data to determine a location of the object,
    wherein the additional data comprises velocity sensor data;
    wherein the image data comprises a plurality of images captured at different points of time;
    wherein in the step of processing image data, a plurality of lines corresponding to directions between the camera and the object at different points of time are determined; and
    wherein in the step of combining information to determine a location of the object, at least one spatial vector is fitted in between the lines, which spatial vector depends on the velocity sensor data and a time difference between the different points of time.

10. The method according to claim 9, wherein the velocity sensor data is based on a measurement by a Doppler radar sensor.

11. The method according to claim 10, wherein the image data comprises images captured at at least three different points of time;
    wherein in the step of processing image data, at least three lines corresponding to directions between the camera and the object at at least three different points of time are determined; and
    wherein the step of combining information to determine a location of the object comprises: fitting spatial vector hypotheses in between the lines, the spatial vector hypotheses having a vector component depending on the velocity sensor data and a time difference between the different points of time, and identifying a most likely spatial vector hypothesis; and wherein the most likely spatial vector hypothesis corresponds to a spatial vector hypothesis having an identical spatial vector hypothesis connecting a first point on a first line to a second point on a second line, and the second point on the second line to a third point on a third line.

12. The method according to claim 9 further comprising the step of a camera capturing the images corresponding to the image data, wherein the camera is comprised by a robot, wherein the robot is configured not to travel with a speed exceeding 10 km/h, wherein the robot weights less than 50 kg.

13. A robot comprising a processing component configured to carry out the method according to claim 1, wherein the robot further comprises a camera to generate the image data.

14. The robot according to claim 13, wherein the robot is configured not to travel with a speed exceeding 10 km/h and wherein the robot weights less than 50 kg.

15. The robot according to claim 13, wherein the robot comprises a velocity sensor, such as, a Doppler radar sensor.

16. A robot comprising a processing component configured to carry out the method according to claim 9, wherein the robot further comprises a camera to generate the image data.

17. The robot according to claim 16, wherein the robot is configured not to travel with a speed exceeding 10 km/h and wherein the robot weights less than 50 kg.

18. The robot according to claim 16, wherein the robot comprises a velocity sensor, such as, a Doppler radar sensor.

\* \* \* \* \*